US008483709B2

(12) United States Patent
Park et al.

(10) Patent No.: US 8,483,709 B2
(45) Date of Patent: Jul. 9, 2013

(54) LOCATION UPDATE METHOD AND MOBILE STATION USING THE SAME

(75) Inventors: Gi Won Park, Seongnam-si (KR); Ki Seon Ryu, Anyang-si (KR); In Uk Jung, Anyang-si (KR); Yong Ho Kim, Anyang-si (KR); Jin Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 203 days.

(21) Appl. No.: 13/124,381

(22) PCT Filed: Oct. 15, 2009

(86) PCT No.: PCT/KR2009/005935
§ 371 (c)(1),
(2), (4) Date: Apr. 14, 2011

(87) PCT Pub. No.: WO2010/044618
PCT Pub. Date: Apr. 22, 2010

(65) Prior Publication Data
US 2011/0201354 A1    Aug. 18, 2011

Related U.S. Application Data

(60) Provisional application No. 61/105,431, filed on Oct. 15, 2008.

(30) Foreign Application Priority Data

Oct. 28, 2008   (KR) .................. 10-2008-0106034
Oct. 29, 2008   (KR) .................. 10-2008-0106701
Nov. 3, 2008    (KR) .................. 10-2008-0108413

(51) Int. Cl.
*H04W 24/00*    (2009.01)
(52) U.S. Cl.
USPC ..................................... 455/456.1
(58) Field of Classification Search
USPC ............. 455/436, 458, 434, 410, 550.1, 411, 455/404.2, 435.2, 418, 446, 456.1; 370/235, 370/331, 338, 328, 252, 329
See application file for complete search history.

(56) References Cited

U.S. PATENT DOCUMENTS

| 2007/0105568 | A1* | 5/2007 | Nylander et al. ............. 455/458 |
| 2008/0188221 | A1 | 8/2008 | Hashimoto et al. |
| 2009/0092097 | A1* | 4/2009 | Nylander et al. ............. 370/331 |
| 2009/0156213 | A1* | 6/2009 | Spinelli et al. ................ 455/436 |
| 2009/0221287 | A1* | 9/2009 | Balasubramanian et al. 455/434 |

FOREIGN PATENT DOCUMENTS

| JP | 08-214359 | 8/1996 |
| KR | 1020030045895 | 6/2003 |

* cited by examiner

*Primary Examiner* — Kiet Doan
(74) *Attorney, Agent, or Firm* — Lee, Hong, Degerman, Kang & Waimey

(57) ABSTRACT

A location update method and a mobile station using the same are disclosed. The location method includes receiving a message including femto Base Station (BS) list information from a macro base station, receiving a preamble including an IDentifier (ID) of a first femto BS from the first femto BS during a predetermined interval, and updating a location to the first femto BS, if the ID of the femto BS is identical to one of IDs included in the femto BS list information. The femto BS list information may include IDs of one or more femto BSs included in the macro BS.

19 Claims, 12 Drawing Sheets

Paging Controller Context (MS side):

| MS ID | Subscribed SG ID | Femto Paging Group ID | Macro Paging Group ID |
|---|---|---|---|
| A | CSG 1, 3 | 1, 3 | C |
| B | CSG 2 | 2 | C |

Paging Controller Context (Femto BS side):

| Femto BS ID | Access granted CSG ID | Femto Paging Group ID | Macro Paging Group ID |
|---|---|---|---|
| 1 | CSG 1 | 1 | C |
| 2 | CSG 1 | 1 | C |
| 3 | CSG 1 | 1 | C |
| 4 | CSG 3 | 3 | C |
| 5 | CSG 3 | 3 | C |
| 6 | CSG 3 | 3 | C |
| 7 | CSG 2 | 2 | C |
| 8 | CSG 2 | 2 | C |
| 9 | CSG 2 | 2 | C |

LOCATION UPDATE METHOD AND MOBILE STATION USING THE SAME

CROSS-REFERENCE TO RELATED APPLICATIONS

This application is the National Stage filing under U.S.C. 371 of International Application No. PCT/KR2009/005935, filed on Oct. 15, 2009, which claims the benefit of earlier filing date and right to priority to Korean Application Nos. 10-2008-0108413, filed on Nov. 3, 2008, 10-2008-0106701, filed on Oct. 29, 2008, and 10-2008-0106034, filed on Oct. 28, 2008, and also claims the benefit of U.S. Provisional Application Ser. No. 61/105,431, filed on Oct. 15, 2008, the contents of which are all incorporated by reference herein in their entirety.

TECHNICAL FIELD

The present invention relates to a wireless access system, and more particularly, to methods for updating its location in an idle-mode mobile station.

BACKGROUND ART

A brief description will be made below of idle mode of a Mobile Station (MS) and a paging group in relation to exemplary embodiments of the present invention.

Generally, idle mode is intended as a mechanism to allow an MS to become periodically available for downlink broadcast traffic messaging without requiring the MS to register to any particular Base Station (BS) as the MS moves in a radio link environment populated by multiple BSs.

If the MS has not received traffic from a BS for a predetermined time, it may transition to the idle mode to save power. In the idle mode, the MS receives a broadcast message (e.g. a paging message) from the BS during an available interval and determines whether to transition to normal mode or to stay in the idle mode. Also, the MS may notify a paging controller of its location by location update in the idle mode.

The idle mode may be beneficial to the MS by relieving the MS of an active requirement for handover and normal operational requirements. The idle mode restricts the MS's activity to scanning during discrete periods, so that the MS conserves power and operation resources.

Besides, the idle mode may benefit a network and a BS by providing a simple and timely scheme for alerting an MS to pending downlink traffic directed toward the MS and by eliminating an air interface and network handover traffic from an inactive MS.

Paging is a function of, upon generation of an incoming call in mobile communications, locating an MS for which the incoming call is intended (e.g. detecting a BS or a Mobile Switching Center (MSC) to which the MS belongs). A plurality of BSs supporting the idle mode may be divided into specified paging groups, covering paging areas.

The paging groups are logical groups. The purpose of these paging groups is to offer a contiguous coverage area in which the MS can be paged on a downlink if there is traffic targeted at it. Preferably, the paging groups are large enough for an MS to stay most of its time within the same paging group and small enough to render paging overhead reasonable.

A paging group may include one or more BSs and one BS may be a member of one or more paging groups. The paging groups are defined in a management system. A paging group may use a paging group-action backbone message. The paging controller uses another backbone message, paging-announce, to manage the list of MSs in the idle mode and initiate paging of an MS on all BSs belonging to a paging group.

DISCLOSURE

Technical Problem

Exemplary embodiments of the present invention are intended for idle mode in a femto cell, applicable to a general BS or paging group.

A femto cell is a low-power mini cell area managed by an indoor BS, designed for use in residential and/or small business environments. While a femto cell is used interchangeably with a pico cell in a similar meaning, the femto cell is regarded as a more advanced type than the pico cell. A femto BS is a small cellular BS that connects to a broadband router. The femto BS functions to connect legacy $2^{nd}$ Generation (2G) and/or $3^{rd}$ Generation (3G) voice and data to a backbone network of a mobile communication service provider via a Digital Subscriber Line (DSL) link or the like.

As it eliminates a shadowing area of a general BS, the femto cell extends service coverage of the system. Also the femto cell facilitates infrastructure installation with low cost, compared to a general BS, and accelerates Fixed Mobile Convergence (FMC).

However, there is no specified method for updating its location in an MS, when it moves between a femto cell and a macro cell or between femto cells in idle mode.

In addition, if the MS updates its location each time it transverses multiple femto cell areas defined in a macro cell, a location update signaling overhead may result.

An object of the present invention devised to solve the problem lies on a method for efficiently updating a location of an MS when the MS moves between femto cells or between a femto cell and a macro cell.

Another object of the present invention devised to solve the problem lies on a location update procedure of an MS based on a recommended femto BS list.

Another object of the present invention devised to solve the problem lies on a Closed Subscriber Group (CSG) which is a new paging group for efficient paging of a femto cell.

A further object of the present invention devised to solve the problem lies on a method for designing a new paging area based on a CSG and enabling a paging controller to efficiently page an MS located in a femto cell area.

It will be appreciated by persons skilled in the art that the objects that could be achieved with the present invention are not limited to what has been particularly described hereinabove and the above and other objects that the present invention could achieve will be more clearly understood from the following detailed description taken in conjunction with the accompanying drawings.

Technical Solution

The object of the present invention can be achieved by providing a wireless access system, particularly methods for updating a location in idle mode in an MS.

In an aspect of the present invention, provided herein is a method for updating a location in idle mode in an MS, including receiving a message including femto BS list information from a macro BS, receiving a preamble including an ID of a first femto BS (e.g. a Closed Subscriber Group (CSG)) from the first femto BS during a predetermined interval, and updating a location to the first femto BS, if the ID of the femto BS is identical to one of IDs included in the femto BS list information. The femto BS list information may include IDs of one or more femto BSs included in the macro BS.

The femto BS list information may be transmitted from a paging controller to the macro BS over a backbone network.

In another aspect of the present invention, provided herein is a method for updating a location in idle mode in an MS, including transmitting a first message (e.g. a Ranging Request (RNG-REQ) message) including location information and speed information about the MS to a macro BS, receiving a second message (e.g. a Ranging Response (RNG-RSP) message) including a femto BS list from the macro BS, receiving a preamble including an ID of a first femto BS from the first femto BS during a predetermined interval, and updating a location to the first femto BS, if the ID of the femto BS is identical to one of IDs included in the femto BS list. The femto BS list may include IDs of femto BSs included in one or more macro BSs to which the MS is expected to move based on the location information and speed information about the MS.

A paging controller may make the femto BS list and transmit the femto BS list to the macro BS over a backbone network. Also, the paging controller may have preferred information about one or more femto BSs preferred by the MS and make the femto BS list based on the preferred information.

The location information about the MS may include information about coordinates of the MS and information about a direction of the MS.

In another aspect of the present invention, provided herein is a method for updating a location in idle mode in an MS, including receiving a message including an ID of a first femto paging group including one or more femto BSs from a macro BS, and updating a location to a femto BS included in the first femto paging group, if the ID of the first femto paging group is identical to an ID of a femto paging group to which the MS subscribed. The first femto paging group may be included in a cell area of the macro BS.

The first femto paging group may be distinguished according to a service or a service provider.

The method may further include receiving a paging message from the femto BS. Herein the paging message may be transmitted from a paging controller to all femto paging groups to which the MS subscribed and the MS may receive the paging message from the femto BS.

The method may further include receiving a paging message from the femto BS. Herein the paging controller may transmit the paging message to a femto BS to which the MS updated a location for the last time, and if there is no response for the paging message from the MS, the paging controller may retransmit the paging message to all femto paging groups to which the MS subscribed.

The method may further include updating a location to the macro BS, if the MS moves out of a cell area of the first femto paging group.

During the location updating, it may be determined whether a location update triggering condition is satisfied, and if the location update triggering condition is satisfied, the location update to the femto BS may be performed.

In another aspect of the present invention, provided herein is a method for updating a location in idle mode in an MS, including periodically measuring signal quality of a macro BS, searching for a femto BS included in a femto paging group to which the MS subscribed, if the signal quality of the macro BS is lower than a predetermined threshold, and updating a location to the femto BS, when the femto BS is detected.

The method may further include updating a location to the macro BS, if the MS moves out of a cell area of the femto paging group.

In another aspect of the present invention, provided herein is an MS including a receiver for receiving an external radio signal, and a processor. The receiver may receive from a macro BS femto BS list information including IDs of one or more femto BSs included in the macro BS, and receive a preamble including an ID of a first femto BS from the first femto BS during a predetermined interval. The processor may compare the ID of the first femto BS received by the receiver with the IDs included in the femto BS list information, and if the ID of the first femto BS is identical to one of the IDs included in the femto BS list, update a location to the first femto BS.

In another aspect of the present invention, provided herein is an MS including a receiver for receiving an external radio signal, a transmitter for transmitting a radio signal externally, and a processor. The receiver may receive a second message including a femto BS list from a macro BS and receive a preamble including an ID of a first femto BS from the first femto BS during a predetermined time interval. The processor may generate a first message including location information and speed information about the MS and transmit the first message to the macro BS through the transmitter. The processor may compare the ID of the first femto BS with IDs included in the femto BS list and if the ID of the first femto BS is identical to one of the IDs included in the femto BS list, update a location to the first femto BS.

In another aspect of the present invention, provided herein is an MS including a receiver for receiving an external radio signal and a processor. The receiver may receive a message including an ID of a first femto paging group including one or more femto BSs from a macro BS. The processor may compare the ID of the first femto paging group with an ID of a femto paging group to which the MS subscribed and if the ID of the first femto paging group is identical to the ID of the femto paging group to which the MS subscribed, update a location to a femto BS included in the first femto paging group. The first femto paging group may be included in a cell area of the macro BS.

The receiver may receive a paging message from the femto BS. Herein, the femto BS may be transmitted from a paging controller to all femto paging groups to which the MS subscribed and the paging message may be received from the femto BS.

If the MS moves out of a cell area of the first femto paging group, the processor may update a location to the macro BS. Or the processor may determine whether a location update triggering condition is satisfied and update a location to the femto BS, if the location update triggering condition is satisfied.

In a further aspect of the present invention, provided herein is an MS including a receiver for receiving an external radio signal and a processor. The processor may periodically measure the signal quality of a signal received from a macro BS. If the signal quality measurement is lower than a predetermined threshold, the processor may search for a femto BS included in a femto paging group to which the MS subscribed and update a location to the femto BS, if the femto BS is detected.

If the MS moves out of a cell area of the femto paging group, the processor may update a location to the macro BS.

Those skilled in the art will appreciate that the exemplary embodiments of the present invention are merely part of preferred embodiments of the present invention and various embodiments of the present invention reflecting the technical features of the present invention can be derived and understood from the following detailed description of the present invention.

Advantageous Effects

Exemplary embodiments of the present invention have the following effects.

When an MS moves between femto cells or between a femto cell and a macro cell, it can efficiently update its location in accordance with the exemplary embodiments of the present invention.

A paging controller or a BS can perform paging efficiently and an MS can efficiently update its location, using CSGs according to the exemplary embodiments of the present invention.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

Figure 1:
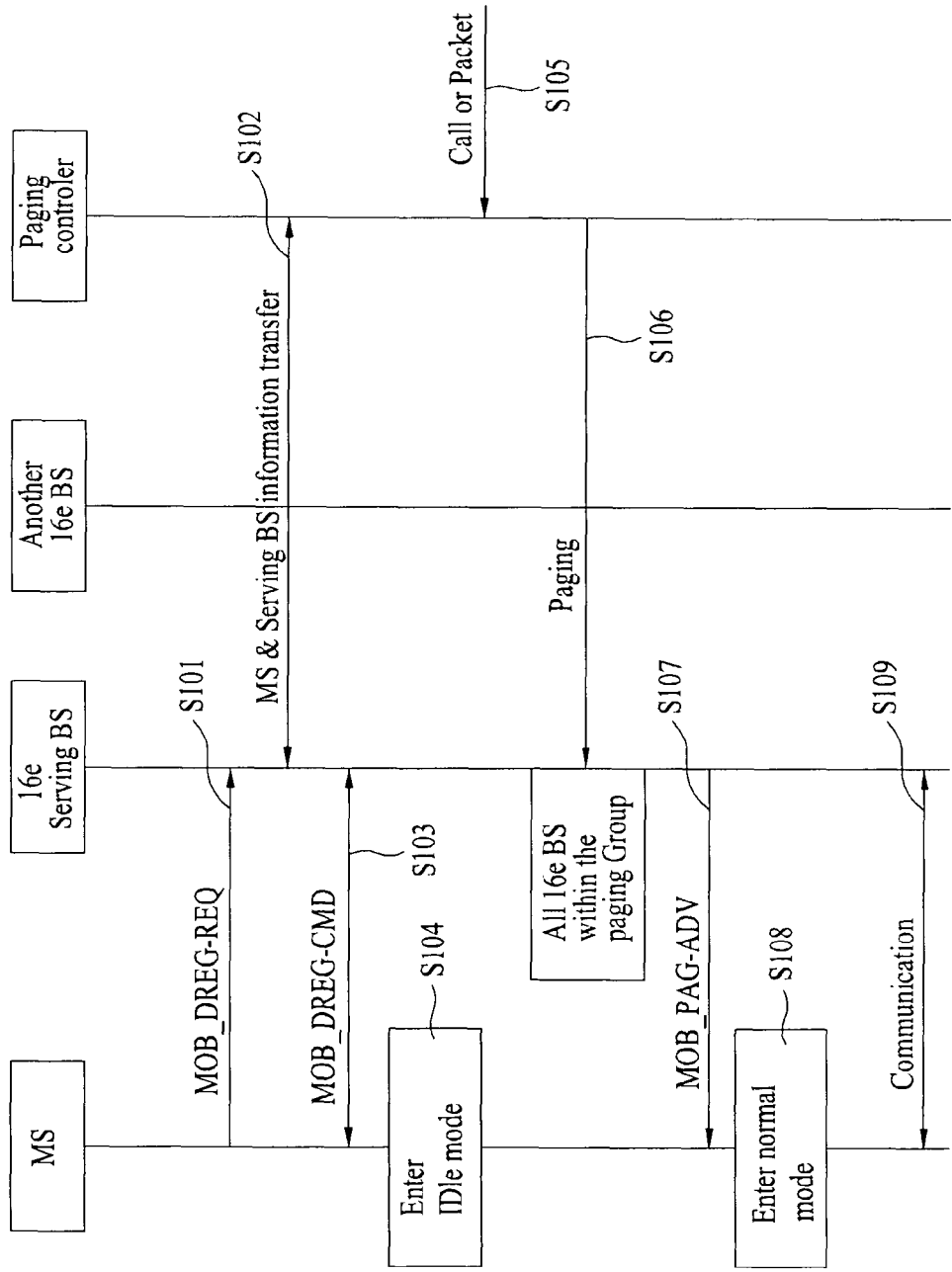
FIG. 1 is a diagram illustrating a signal flow for a paging procedure in an Institute of Electrical and Electronics Engineers (IEEE) 802.16 system which is a wireless access system.

The present invention relates to a wireless access system. More particularly, the present invention relates to a method for updating its location in an idle-mode Mobile Station (MS).

Exemplary embodiments described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

In the description of drawings, procedures or steps, which may ruin the substance of the present invention, are not explained. And, procedures or steps, which can be understood by those skilled in the art, are not explained as well.

In exemplary embodiments of the present invention, a description is made of a data transmission and reception relationship between a Base Station (BS) and an MS. Herein, the term 'BS' refers to a terminal node of a network, which communicates directly with the MS. In some cases, a specific operation described as performed by the BS may be performed by an upper node of the BS.

Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'eNode B (eNB)', 'access point', etc. The term 'MS' may be replaced with the term 'User Equipment (UE)', 'Subscriber Station (SS)' 'Mobile Subscriber Station (MSS)', 'Advanced MS (AMS)', 'mobile terminal', etc.

A transmitter means a node that transmits voice or data service and a receiver means a node that receives voice or data service. Hence, an MS may be a transmitter and a BS may be a receiver, on an uplink. Likewise, the MS may be a receiver and the BS may be a transmitter, on a downlink.

Meanwhile, the MS may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, etc.

Exemplary embodiments of the present invention may be achieved by various means, for example, hardware, firmware, software, or a combination thereof.

In a hardware configuration, methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, and/or microprocessors.

In a firmware or software configuration, the methods according to the exemplary embodiments of the present invention may be implemented in the form of a module, a procedure, a function, etc. performing the above-described functions or operations. A software code may be stored in a memory unit and executed by a processor. The memory unit is located at the interior or exterior of the processor and may transmit and receive data to and from the processor via various known means.

Exemplary embodiments of the present invention are supported by standard documents disclosed for at least one of wireless access systems including Institute of Electrical and Electronics Engineers (IEEE) 802 systems, 3$^{rd}$ Generation Project Partnership (3GPP) systems, 3GPP Long Term Evolution (LTE) systems, and 3GPP2 systems. In particular, the steps or parts, which are not described to clearly reveal the technical idea of the present invention, in the exemplary embodiments of the present invention may be supported by the above documents. All terminologies used herein may be supported by at least one of P802.16-2004, P802.16e-2005, and P802.16Rev2 documents which describe the standards of IEEE 802.16.

Specific terms used in the following description are provided to help the understanding of the present invention. These specific terms may be replaced with other terms within the scope and spirit of the present invention.

For example, a macro BS refers to a BS including one or more femto BSs. The macro BS may be a general BS. Also, the macro BS may be a BS that manages a wide paging area including one or more BSs.

FIG. 1 is a diagram illustrating a signal flow for a paging procedure in an IEEE 802.16 system which is a wireless access system.

In idle mode, paging may be performed on a paging group basis. For instance, an MS may be a member of one or more paging groups. In each paging group, upon receipt of an incoming call for an MS or a packet directed to the MS from an external network, a paging controller pages the MS to detect it. For the paging, specifically, the paging controller may transmit a paging message to all BSs within the paging group and, upon receipt of the paging message, each BS broadcasts a Mobile Paging Advertisement (MOB_PAG-ADV) message to MSs.

Referring to FIG. 1, an MS transmits a Mobile Deregistration Request (MOB_DREG-REQ) message to a serving BS to transition from normal mode to idle mode in step S101.

Upon receipt of the MOB_DREG-REQ message, the serving BS may transmit and receive serving BS information and MS information to and from a paging controller in step S102. Specifically, the serving BS may notify the paging controller of an Identifier (ID) of the MS that intends to enter the idle mode and an ID of the serving BS. The PC may transmit a paging group ID or an ID of the paging controller to the serving BS. The paging group ID or the paging controller ID may be used for transmission and reception of a paging message.

The serving BS may a Mobile Deregistration Command (MOB_DREG-CMD) message to the MS in response to the MOB_DREG-REQ message in step S103. The MOB_DREG-CMD message may include paging information (e.g. a paging cycle, a paging offset, and a paging listening interval). The MOB_DREG-CMD message may further include the paging controller ID and the paging group ID.

Upon receipt of the MOB_DREG-CMD message, the MS enters the idle mode in step S104. The MS may receive a paging message based on the paging information received by the MOB_DREG-CMD message. During a paging listening interval, the MS may monitor a radio channel to determine whether there is a paging message directed to it. The MS may operate in sleep mode during the remaining time periods, thereby saving battery power.

In step S105, the paging controller may receive an incoming call or an external packet.

Then the paging controller may perform a paging procedure. In step S106, the paging controller transmits a paging message to all BSs of the paging group.

Upon receipt of the paging message, the BSs of the paging group broadcast a Mobile Paging Advertisement (MOB_PAG-ADV) message to their managed MSs in step S107.

The MS checks the MOB_PAG-ADV message and if the paging controller has paged the MS, it may enter normal mode in step S108 and communicate with the serving BS in step S109.

Now a detailed description will be made of location update procedures according to exemplary embodiments of the present invention.

In the idle mode, the MS may update its location according to a variety of location update triggering conditions. The MS may perform timer-based location update, paging group location update, power down location update, Medium Access Control (MAC) hash skip threshold update, etc.

For example, upon expiration of a location update timer in an MS, a macro BS, and/or a femto BS, the MS may carry out a timer-based location update. If its paging group is changed, the MS may perform a paging group location update. Before power-off, the MS may perform a power down location update.

If a femto BS defined in exemplary embodiments of the present invention is changed, the MS may update its location. Also, if a femto paging group including one or more femto BSs is changed, the MS may update its location.

Figure 2:
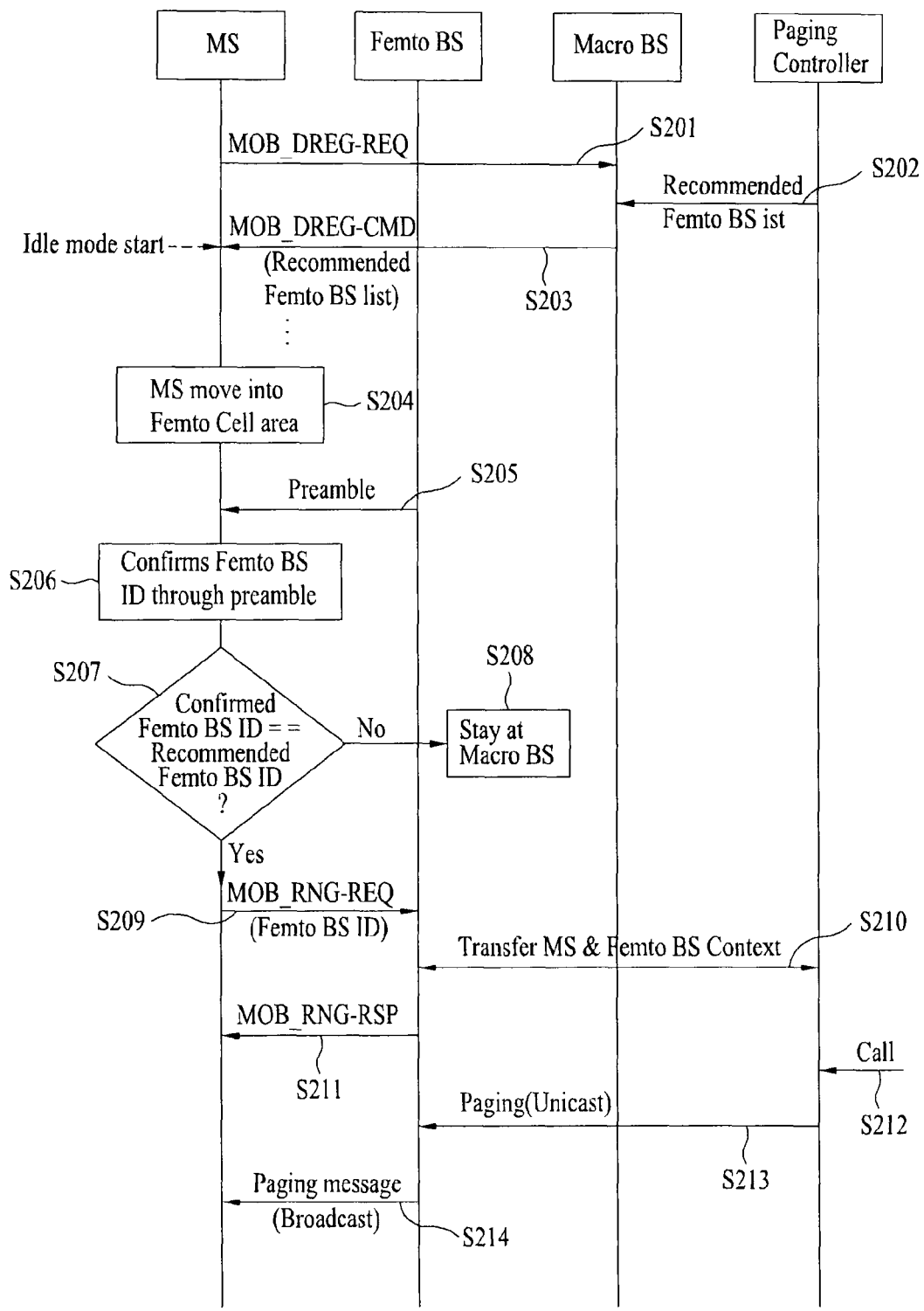
FIG. 2 is a diagram illustrating a signal flow for a location update method based on a recommended femto Base Station (BS) list according to an exemplary embodiment of the present invention.

FIG. 2 is a diagram illustrating a signal flow for a location update method based on a recommended femto BS list according to an exemplary embodiment of the present invention.

Referring to FIG. 2, an MS may transmit a MOB_DREG-REQ message to a macro BS in order to transition from normal mode to idle mode in step S201.

Upon receipt of the MOB_DREG-REQ message, the macro BS may transmit and receive MS information and macro BS information to and from a paging controller. Specifically, the macro BS may notify the paging controller of an ID of the MS that intends to enter the idle mode and an ID of the macro BS. The paging controller may notify the macro BS of a paging group ID and/or an ID of the paging controller. In step S202, the paging controller may transmit an MS-recommended femto BS list to the macro BS.

The macro BS may transmit to the MS a MOB_DREG-CMD message including information about a paging cycle, a paging offset, the paging group ID, the recommended femto BS list, etc. in step S203.

Table 1 below illustrates an exemplary format of the MOB_DREG-CMD message transmitted in step S203.

TABLE 1

| Syntax | Size (bit) | Notes |
|---|---|---|
| MOB_DREG-CMD_Message_format( ) { | — | — |
| ~ | | |
| Recommended Femto BS List | | List of MS-preferred femto BSs (this field may be transmitted by RNG-RSP in another exemplary embodiment of the present invention) |
| ~ | | |
| } //End of MOB_DREG-CMD | | |

Referring to Table 1, the MOB_DREG-CMD message may include the recommended femto BS list. While not described in Table 1, the MOB_DREG-CMD message may further have typical information intended for it. It may be contemplated as another exemplary embodiment of the present invention that the recommended femto BS list is transmitted to the MS by a Ranging Response (RNG-RSP) message during a location update.

One thing to note herein is that besides the macro BS, a femto BS may transmit parameters set in the MOB_DREG-CMD message to the MS. For transmission of the parameter illustrated in Table 1 to the MS, the macro BS and the femto BS may use a Broadcast CHannel (BCH), an additional system information message, and a neighbor advertisement (NBR-ADV) message.

When the MS moves from the cell area of the macro BS, namely the macro cell area to the cell area of the femto BS, namely the femto cell area in step S204, it may receive a preamble including an ID of the femto BS from the femto BS in step S205.

In step S206, the MS may confirm the ID of the femto BS from the preamble.

The MS may compare the ID of the femto BS with IDs included in the recommended femto BS list in step S207.

In the absence of the ID of the femto BS in the recommended femto BS list, the MS may stay in the macro cell area (e.g., in a serving macro cell or another macro cell) in the idle mode without a location update to the femto BS in step S208.

On the contrary, if the ID of the femto BS is included in the recommended femto BS list, the MS may perform a location update procedure with the femto BS. Hence, the MS may initiate the location update procedure by transmitting a Ranging Request (RNG-REQ) message including the femto BS ID to the femto BS in step S209.

Table 2 below illustrates an exemplary format of the MOB_RNG-REQ message transmitted in step S209.

TABLE 2

| Syntax | Size (bit) | Notes |
| --- | --- | --- |
| MOB_RNG-REQ_Message_format( ) { | — | — |
| ~ | | |
| Paging controller ID | | |
| Femto BS ID | | ID of Femto BS to which MS has moved |
| ~ | | |
| } //End of MOB_RNG-REQ | | |

Referring to Table 2, the MOB_RNG-REQ message may include the paging controller ID and the ID of the femto BS to which the MS has moved.

In step S210, the femto BS may transmit MS information and femto BS information to the paging controller, to thereby indicate that the MS has moved into its cell area.

The paging controller may be aware of the movement of the MS from the macro cell to the femto cell. In step S211, the femto BS may notify the MS whether the location update is successful by a MOB_RNG-RSP message in step S211.

After the location update of the MS is completed successfully, upon receipt of an external incoming call or packet in step S212, the paging controller may unicast a paging signal to the femto BS to which the MS has moved in step S213.

Upon receipt of the paging signal, the femto BS may broadcast a paging message to MSs within its cell area in step S214.

Figure 3:
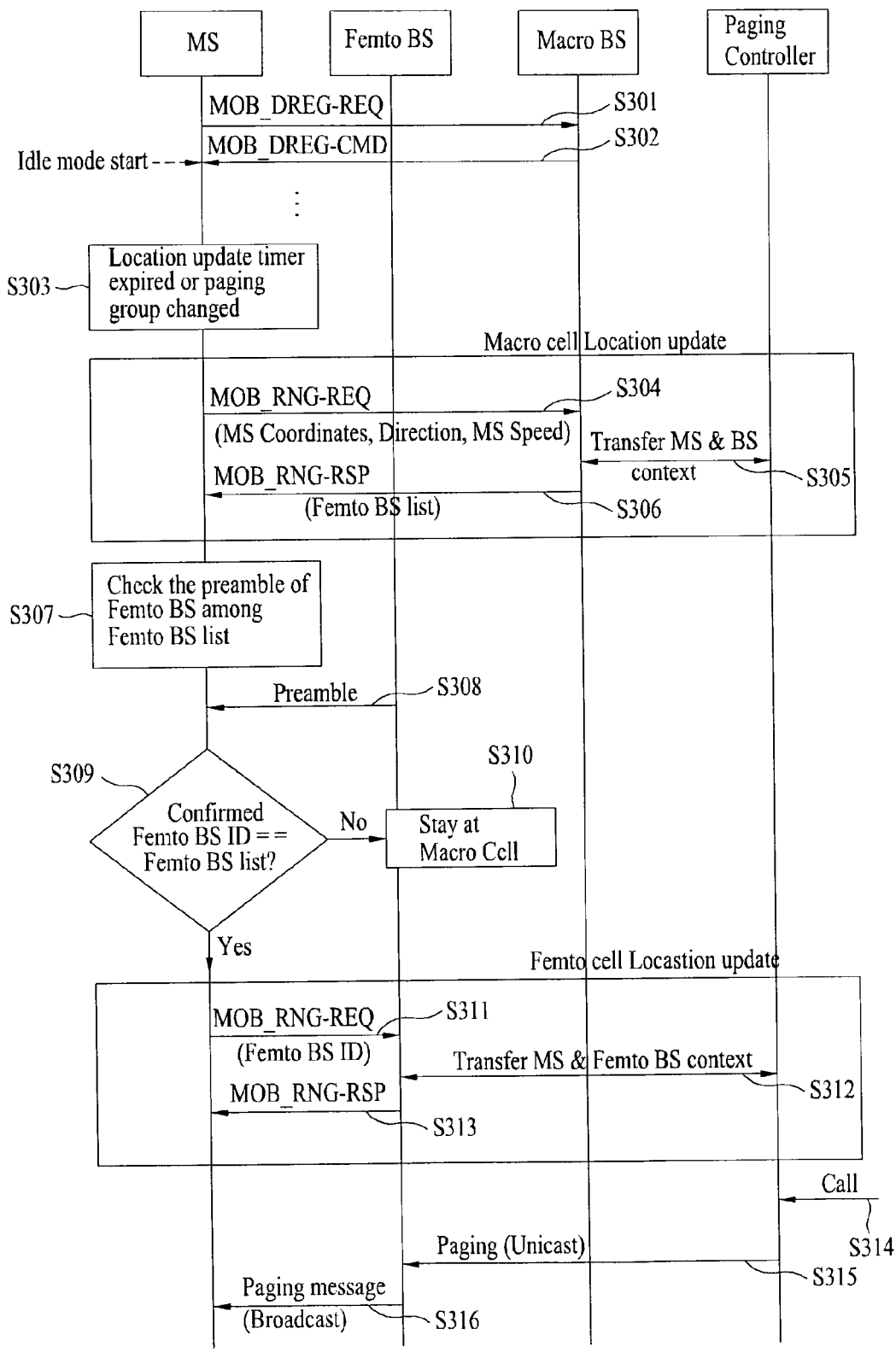
FIG. 3 is a diagram illustrating a signal flow for a paging method based on location information about a Mobile Station (MS) according to an exemplary embodiment of the present invention.

FIG. 3 is a diagram illustrating a signal flow for a paging method based on location information about an MS according to an exemplary embodiment of the present invention.

Referring to FIG. 3, an MS may transmit a MOB_DREG-REQ message to a macro BS in order to transition from normal mode to idle mode in step S301.

Upon receipt of the MOB_DREG-REQ message, the macro BS may command the MS to enter the idle mode by transmitting to the MS a MOB_DREG-CMD message including information about a paging cycle, a paging offset, a paging group ID, etc. in step S302.

If a location update triggering condition is satisfied (e.g. expiration of a location update timer or change of a paging group), the MS may perform a location update with the macro BS in step S303.

For the location update with the macro BS, the MS may transmit to the macro BS a MOB_RNG-REQ message including speed information about the MS and location information about the MS (e.g. the coordinates and/or direction of the MS) in step S304.

Table 3 below illustrates an exemplary format of the MOB_RNG-REG message transmitted in step S304.

TABLE 3

| Syntax | Size (bit) | Notes |
| --- | --- | --- |
| MOB_RNG-REQ_Message_format( ) { | — | — |
| ~ | | |
| Paging controller ID | | |
| MS Coordinates | | The coordinates of the MS |
| MS Direction | | The direction of the MS (Vector) |
| MS Speed | | Bit #0: Current MS Speed (Speed of the MS measured at current time point) Bit #1: Average MS Speed(Average speed of the MS during pre-defined duration) |
| ~ | | |
| } //End of MOB_RNG-REQ | | |

Referring to Table 3, the MOB_RNG-REQ message may include a paging controller ID, the coordinates of the MS, the direction of the MS, and the speed of the MS. If the MS speed parameter is set to '0', this indicates the current speed of the MS. If the MS speed parameter is set to '1', this indicates the average speed of the MS.

If the MS is Global Positioning System (GPS)-enabled, it may transmit location information including its coordinates to the macro BS in step S304.

The macro BS may transmit the speed information and location information about the MS to the paging controller over a backbone network. In step S305, the macro BS may also transmit to the paging controller a context including an ID and MAC address of the MS, an ID of a Closed Subscriber Group (CSG) to which the MS subscribed, and an ID of the macro BS over the backbone network.

Because the paging controller may predict a movement range of the MS based on the speed information and location information about the MS in step S305, it may generate a femto BS list by searching for femto BSs in neighbor areas according to the speed information and location information about the MS. The location information about the MS may include the current coordinates and direction of the MS.

The paging controller may also have an MS-recommended femto BS list (e.g. a list of femto BSs preferred by the MS, including a femto BS to which the MS subscribed). Accordingly, the paging controller may refer to the recommended femto BS list when generating the femto BS list.

The paging controller may make a decision as to whether to transmit the femto BS list to the MS. For example, when the MS is moving fast, the paging controller may not transmit the femto BS list to it. On the other hand, if the MS does not move fast and stays in a specific area, the paging controller may transmit the femto BS list to the MS. However, if the MS stays in a specific area which does not correspond to the cell area of a recommended femto BS, the paging controller may not transmit the femto BS list to the MS.

Therefore, the paging controller may create the femto BS list by determining the predicted movement area of the MS, comprehensively taking into account the speed information and location information about the MS and transmit the femto BS list to the macro BS in step S305.

The macro BS may transmit a MOB_RNG-RSP message including the femto BS list received from the paging controller to the MS in response to the received RNG-REQ message in step S306.

Table 4 illustrates an exemplary format of the MOB_RNG-RSP message that may be used in step S306.

TABLE 4

| Syntax | Size (bit) | Notes |
| --- | --- | --- |
| MOB_RNG-RSP_Message_format( ) { | — | — |
| ~ | | |
| Femto BS list | | List of femto BSs selected from among femto BSs installed in current area of the MS, made by the paging controller |
| ~ | | |
| } //End of MOB_RNG-RSP | | |

During a paging listening interval, the MS may receive preambles from femto BSs. In step S307, the MS may determine whether the received preambles are from femto BSs included in the femto BS list.

Upon receipt of a preamble from a specific femto BS in step S308, the MS may determine whether to update its location to the femto BS or to stay in the macro BS by comparing an ID of the femto BS set in the preamble with IDs included in the femto BS list in step S309.

In the absence of the femto BS ID in the femto BS list, the MS may stay in the macro BS in step S310.

In the presence of the femto BS ID in the femto BS list, the MS may update its location to the femto BS. Hence, the MS may transmit a MOB_RNG-REQ message including the femto BS ID to the femto BS, for the location update, in step S311.

The femto BS may transmit MS information and femto BS information to the paging controller over the backbone network, so that the paging controller is aware of the movement of the MS from the macro cell to the femto cell in step S312.

In step S313, the femto BS may notify the MS whether the location update is successful by a MOB_RNG-RSP message.

Upon receipt of an external incoming call or packet after successful completion the location update of the MS in step S314, the PC may unicast a paging signal to the femto BS to which the MS has moved in step S315.

Upon receipt of the paging signal, the femto BS may broadcast a paging message to MSs within its cell area in step S316.

<Location Update Based on CSGs>

A description will be made of a method for designing paging areas based on CSGs according to exemplary embodiments of the present invention.

A CSG area is a logical area into which femto BSs supporting a specific service are grouped, when an MS subscribes to the specific service. The CSG area may also refer to a logical area into which femto BSs supported by a service provider providing a specific service to an MS are grouped.

In exemplary embodiments of the present invention, a CSG may be used as a paging group of femto cells. For example, a CSG ID may be used as a Femto cell Paging Group (FPG) ID.

Table 5 illustrates an exemplary format of a CSG ID that may be used in the exemplary embodiments of the present invention.

TABLE 5

| Type | Length | Value | Scope |
| --- | --- | --- | --- |
| | | CSG ID: ID of CSG to which MS subscribed | RNG-REQ/RSP, REG-REQ/RSP, BCH, additional system information, DREG-CMD |

Referring to Table 5, CSG ID indicates the ID of a CSG to which an MS subscribed. The CSG ID may be included in RNG-REQ/RSP, REG-REQ/RSP, additional system information, and/or DREG-CMD.

In another exemplary embodiment of the present invention, a femto paging group may be managed on a CSG cell basis. Then a CSG ID may be used as a paging group ID. A plurality of femto cells may be included in one or more CSGs. Also, one CSG may include a single femto cell. The femto cell areas of a CSG may be referred to as a CSG cell area.

Figure 4:
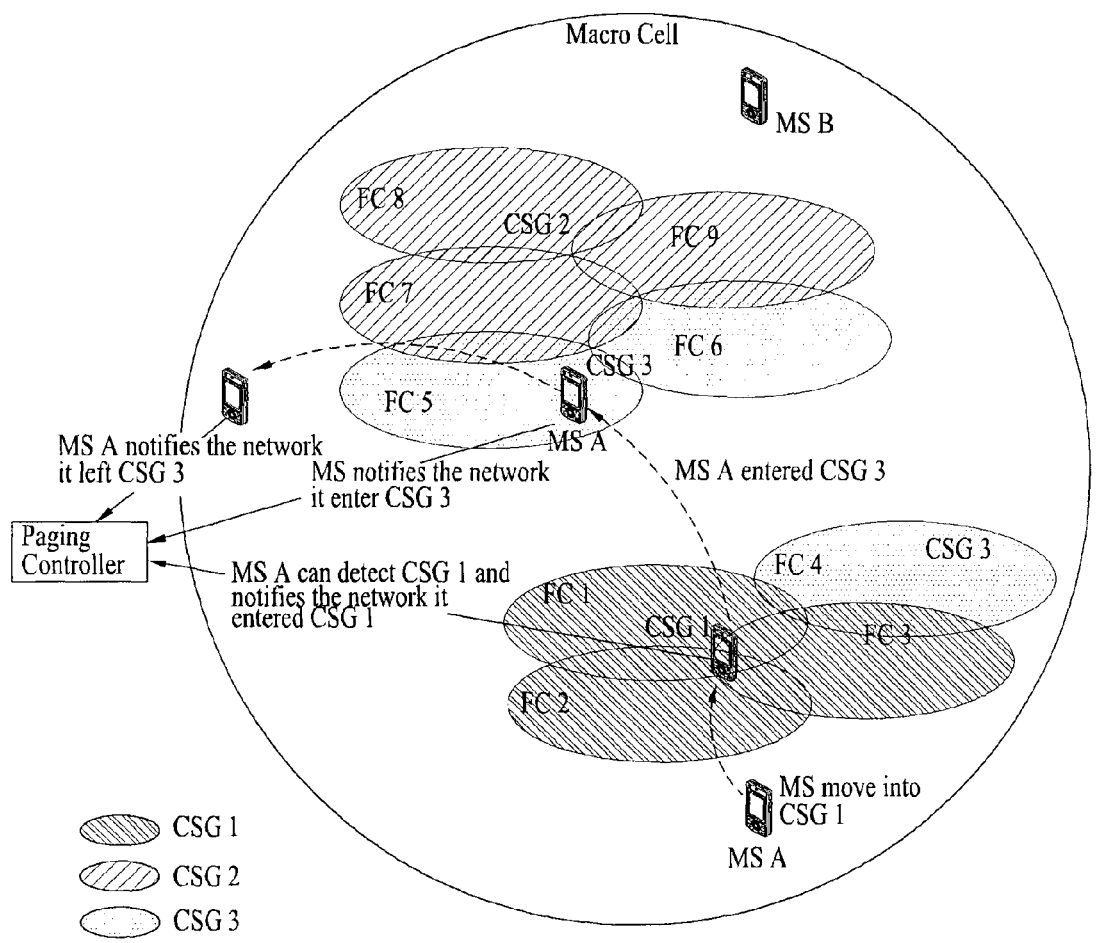
FIG. 4 illustrates a method for configuring paging groups on a Closed Subscriber Group (CSG) basis according to an embodiment of the present invention.

FIG. 4 illustrates a method for configuring paging groups on a CSG basis according to an exemplary embodiment of the present invention.

The paging group configuring method illustrated in FIG. 4 is about how to allocate a new paging group to an MS, when femto cells are considered. In FIG. 4, it is assumed that MS A and MS B exist in a macro cell, MS A subscribed to CSG 1 and CSG 3 and uses CSG ID 1 and CSG ID 3 as FPG IDs, and MS B subscribed to CSG 2 and uses CSG ID 2 as an FPG ID.

A paging controller may store a paging controller context for an MS side, including MS information (e.g. FPG ID information, macro paging group ID information, etc.) and/or a paging controller context for a BS side, including femto BS information (e.g. FPG ID information, macro paging group ID information, etc.). The paging controller may also store macro BS information along with the paging controller context(s).

The paging controller may use MS information, femto BS information (i.e. information about a CSG or a home femto BS of the MS), and macro BS information in order to page the MS. In addition, the paging controller may roughly determine the location of the MS based on the MS information, the femto BS information, and the macro BS information.

Referring to FIG. 4, MS A may move from the macro cell to a femto cell area of CSG 1. If CSG 1 is a CSG that the MS subscribed to, it may update its location with one of the femto BSs included in CSG 1 (e.g. Femto Cell 2 (FC2)). In this manner, MS A may notify the paging controller that it has entered the area of CSG 1.

In the exemplary embodiment of the present invention, although the MS moves to the area of a CSG to which it subscribed, it may perform a location update only if a predetermined location update triggering condition is satisfied. Consequently, the location update overhead of the MS may be reduced.

The location update may be triggered according to a Received Signal Strength Indication (RSSI) and/or a Carrier-to-Interference and Noise Ratio (CINR), or an MS speed.

For example, the MS may measure the RSSI and/or CINR of a signal received from a femto cell during a predetermined time to trigger. If the RSSI and/or CINR of the femto cell is higher than the RSSI and/or CINR of the macro cell, the MS may update its location to the femto cell. Also, if the average or current speed of the MS is equal to or smaller than a predetermined threshold, the MS may update its location to the femto cell.

In FIG. 4, when MS A moves to the area of a femto cell area of a CSG to which it subscribed, it may transmit a random code to perform a location update to a femto cell having the highest RSSI or CINR within the area of the CSG.

In FIG. 4, MS A may move from the area of CSG 1 to the area of CSG 3 (FC 5). Confirming that the ID of FC 5 is identical to the ID of a CSG that MS A subscribed to, MS A may notify the paging controller of the movement from the area of CSG 1 to the area of CSG 3 by location update. If MS A moves out of the area of CSG 3, it may notify the paging controller that it has moved from the area of CSG 3 to the macro cell area by location update.

Figure 5:
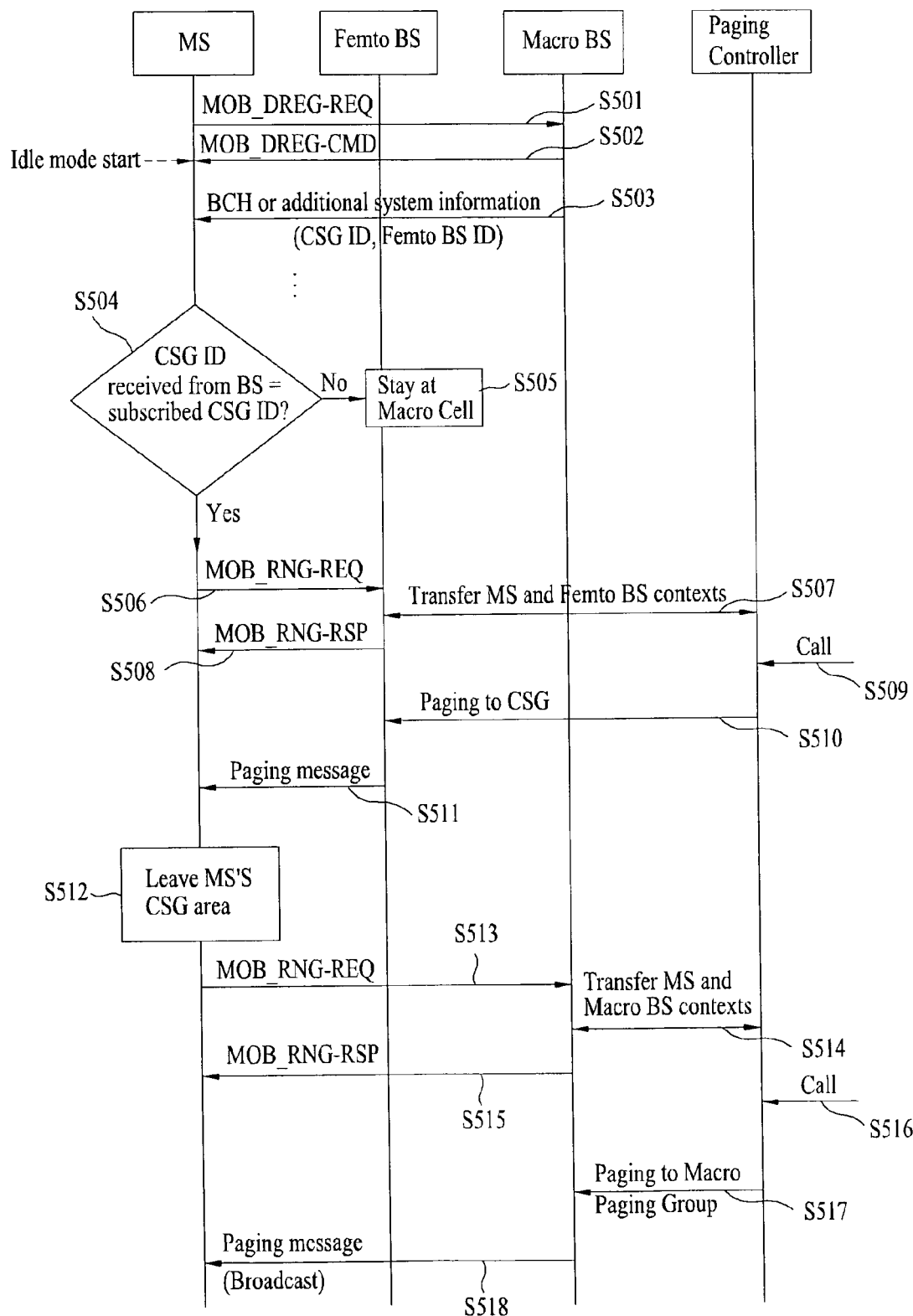
FIG. 5 is a diagram illustrating a signal flow for a method for configuring paging groups on a CSG basis according to another embodiment of the present invention.

FIG. 5 is a diagram illustrating a signal flow for a method for configuring paging groups on a CSG basis according to another exemplary embodiment of the present invention.

The exemplary embodiment of the present invention illustrated in FIG. 5 is based on the technical principle of the exemplary embodiment illustrated in FIG. 4. In the illustrated case of FIG. 5, when an MS moves to the area of a CSG to which it did not subscribe, it may update its location to a macro cell. If the MS moves within the same CSG area, it may not update its location. FIG. 5 illustrates a location update procedure of an MS during its movement.

Referring to FIG. 5, an MS may transmit a MOB_DREG-REQ message to a macro BS to enter idle mode in step S501. The macro BS may transmit to the MS a MOB_DREG-CMD message including a paging cycle, a paging offset, and a paging group ID, in response to the idle mode request, in step S502.

Table 6 illustrates an exemplary format of the MOB_DREG-CMD message used in step S502.

TABLE 6

| Syntax | Size (bit) | Notes |
|---|---|---|
| MOB_DREG-CMD_Message_format( ) { | — | — |
| ~ | | |
| Femto Information | | See table 7 (Femto Information field) |
| ~ | | |
| } //End of MOB_DREG-CMD | | |

Referring to Table 6, the MOB_DREG-CMD message may include the parameters of a paging cycle, a paging offset, and a paging listening interval. The MOB_DREG-CMD message may further include femto information related to femto BSs.

The MS may periodically receive a BCH or additional system information that includes a Femto Information field during every paging listening interval. The Femto Information field may include at least one of a femto BS ID, a CSG ID, and an FPG ID. In step S503, the MS may receive an ID of a CSG including an MS-preferred femto cell on a BCH or by system information.

Table 7 illustrates an exemplary format of the Femto Information field that may be used in step S503.

TABLE 7

| Syntax | Size (bit) | Notes |
|---|---|---|
| N_Femto_BS | | Total number of femto BSs included in macro BS |
| For (i = 0; i < N_Femto_BS; i++) { | | |
| Femto BS ID | | Femto BS ID |
| CSG ID | | ID of CSG allowed by femto BS |
| Femto Paging Group ID (if CSG ID is replaced with Femto Paging Group ID, this is not needed) | | Femto Paging Group ID of MS |
| } | | |

Referring to Table 7, the Femto Information field may include at least one of a femto BS ID, a CSG ID, and an FPG ID. The Femto Information field may specify as many values as the total number of femto BSs included in the macro BS, for each parameter.

The macro BS or a femto BS may transmit to the MS at least one of a BCH, additional system information, and an NBR-ADV message which include the Femto Information field described in Table 7. For example, the femto BS may transmit IDs of neighbor femto BSs, a CSG ID, and an FPG ID to MSs within its cell area by an NBR-ADV message.

In step S504, the MS may compare the CSG ID received from the macro BS with an ID of a CSG that the MS subscribed to.

If the CSG IDs are different, the MS may stay in the macro cell area without a location update to the femto BS in step S505.

On the other hand, if the CSG IDs are identical, the MS may receive a preamble from the femto BS. To perform a location update, the MS may transmit a MOB_RNG-REQ message to the femto BS in step S506.

The femto BS may transmit a context including an ID, MAC address, and CSG ID of the MS and an ID of the femto BS to a paging controller over a backbone network. Thus, the paging controller may be aware of the movement of the MS into the area of the specific femto BS. In step S507, the paging controller may transmit an FPG ID to the femto BS over the backbone network.

The femto BS may transmit a MOB_RNG-RSP message including the FPG ID to the MS in response to the MOB_RNG-REQ message in step S508.

Upon receipt of an external incoming call or packet in step S509, the paging controller may transmit a paging signal to all femto BSs included in the CSG to which the MS subscribed in step S510.

Upon receipt of the paging signal, each femto BS may broadcast a paging message to MSs within its cell area in step S511.

In a mobile communication environment, the MS may move from the area of the subscribed CSG to that of a non-subscribed CSG or the macro cell in step S512.

In this case, the MS may notify the macro BS that it has moved out of the subscribed CSG (i.e. the subscribed femto cell area) by location update. Accordingly, the MS may transmit a MOB_RNG-REQ message to the macro BS to update its location to the macro BS in step S513.

The macro BS may transmit a context including MS information and macro BS information to the paging controller. The paging controller may transmit a macro paging group ID to the macro BS over the backbone network in step S514.

The macro BS may transmit a MOB_RNG-RSP message including the macro paging group ID to the MS in response to the MOB_RNG-REQ message in step S515.

Upon receipt of an external incoming call or packet in step S516, the paging controller may transmit a paging signal to a macro paging group corresponding to the macro paging group ID in step S517.

Upon receipt of the paging signal, the macro BS may broadcast a paging message to MSs within its cell area in step S518.

Figure 6:
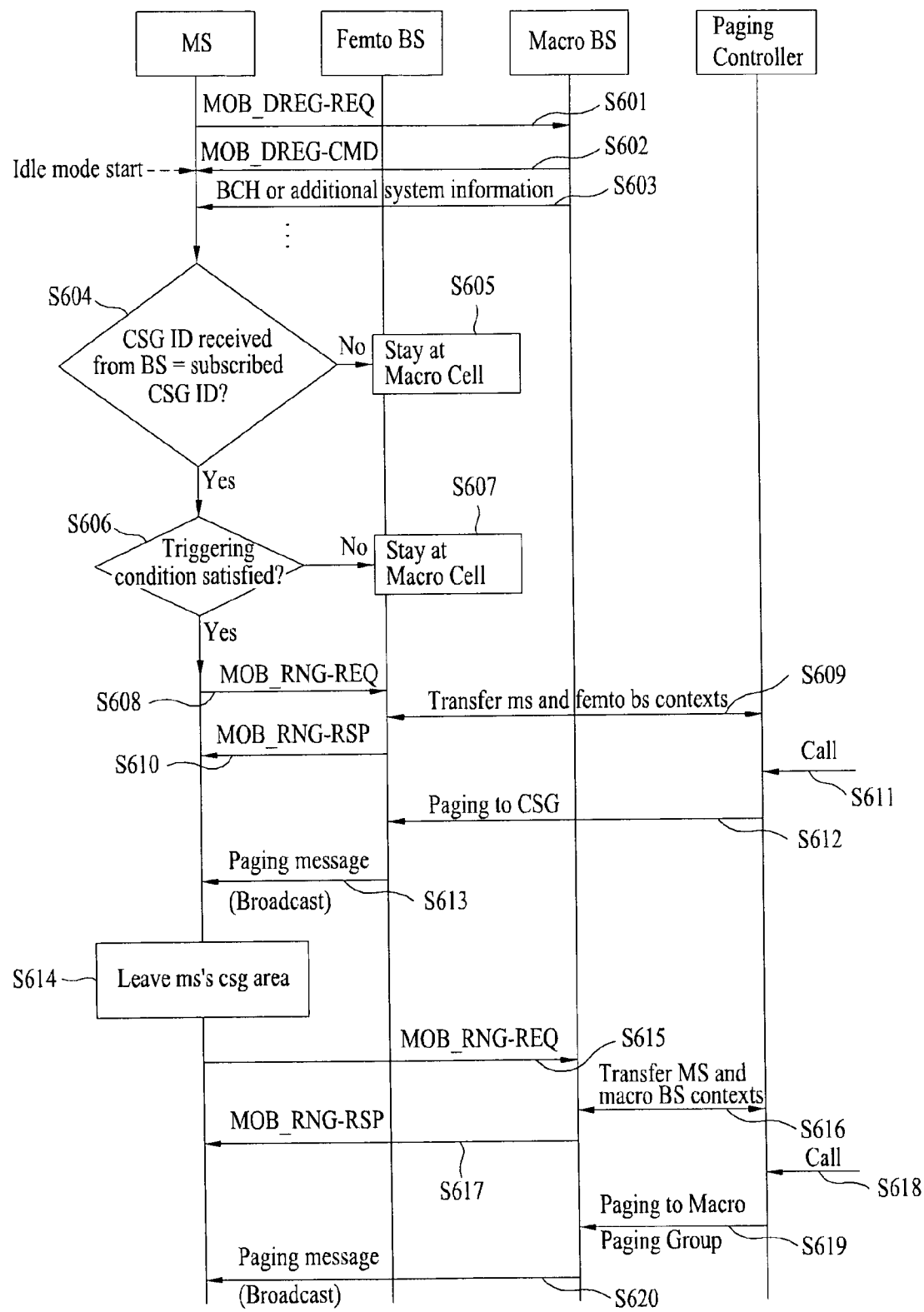
FIG. 6 is a diagram illustrating a signal flow for a method for configuring paging groups on a CSG basis according to a further embodiment of the present invention.

FIG. 6 is a diagram illustrating a signal flow for a method for configuring paging groups on a CSG basis according to a further exemplary embodiment of the present invention.

The exemplary embodiment of the present invention illustrated in FIG. 6 is basically similar to that illustrated in FIG. 5, except that even when a CSG ID transmitted by a macro BS is identical to the ID of a CSG to which an MS subscribed, the MS determines whether a predetermined location update triggering condition is satisfied without immediately updating its location to the macro BS.

Accordingly, steps S601 to S605 are performed in the same manner as in steps S501 to S505. If the CSG ID transmitted by the macro BS is identical to the ID of a CSG to which the MS subscribed in step S604, the MS may determine whether a predetermined location update triggering condition is satisfied to thereby determine whether to update its location to a femto BS. In step s606, the MS may determine whether to update its location depending on whether the location update triggering condition described before with reference to FIG. 4 is satisfied.

If the location triggering condition is not satisfied in step S606, the MS may stay in the macro cell area in step S607.

If the location update triggering condition is satisfied in step S606, the MS may transmit a MOB_RNG-REQ message to the femto BS to update its location to the femto BS in step S608.

Subsequent steps S609 to S620 are performed in the same manner as steps S507 to S518 of FIG. 5.

Figure 7:
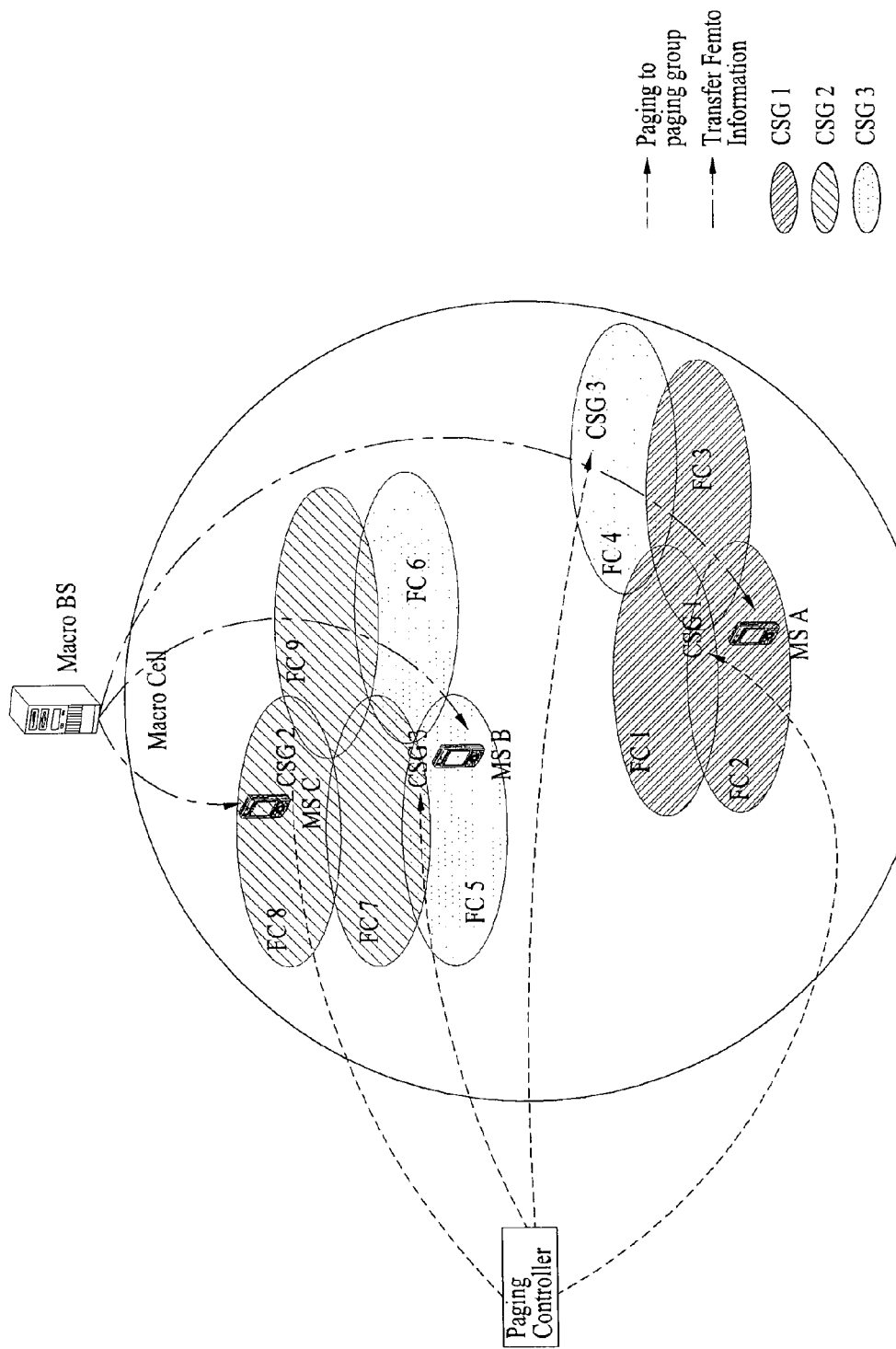
FIG. 7 illustrates a method for transmitting a paging message to a Femto Paging Group (FPG) according to an embodiment of the present invention.

FIG. 7 illustrates a method for transmitting a paging message to an FPG according to an exemplary embodiment of the present invention.

Referring to FIG. 7, CSG 1 may include FC1, FC2 and FC3, CSG 2 may include FC7, FC8 and FC9, and CSG 3 may include FC4, FC5 and FC6. It is assumed herein that an FPG includes a single CSG.

In FIG. 7, a paging controller transmits a paging message to all femto BSs included in CSGs to which MS A, MS B, and MS C subscribed in order to detect them. Each of the CSGs to which MS A, MS B, and MS C subscribed may be set as a paging group.

Therefore, a macro BS may transmit femto information (e.g. a femto BS ID, a CSG ID and/or an FPG ID) to each MS by DREG-CMD, RNG-RSP, a BCH, and/or additional system information.

Referring to FIG. 7, MS A subscribed to CSG 1, MS B subscribed to CSG 3, and MS C subscribed to CSG 2. Because each CSG ID may be used as an FPG ID, the paging controller may transmit a paging message only to femto cells included in CSG 1 to detect MS A, a paging message only to femto cells included in CSG 3 to detect MS B, and a paging message only to femto cells included in CSG 2 to detect MS C.

However, the transmission of a paging message to all femto cells within a CSG area to which an MS subscribed in order to detect the MS may cause overhead to the paging controller in FIG. 7.

If a particular femto cell allows access from all MSs, a paging group may be managed for each femto cell. In this case, the femto cell may or may not be a member of a CSG. In other words, when the femto cell allows access from all MSs irrespective of CSGs, a paging group per femto cell may be managed.

Figure 8:
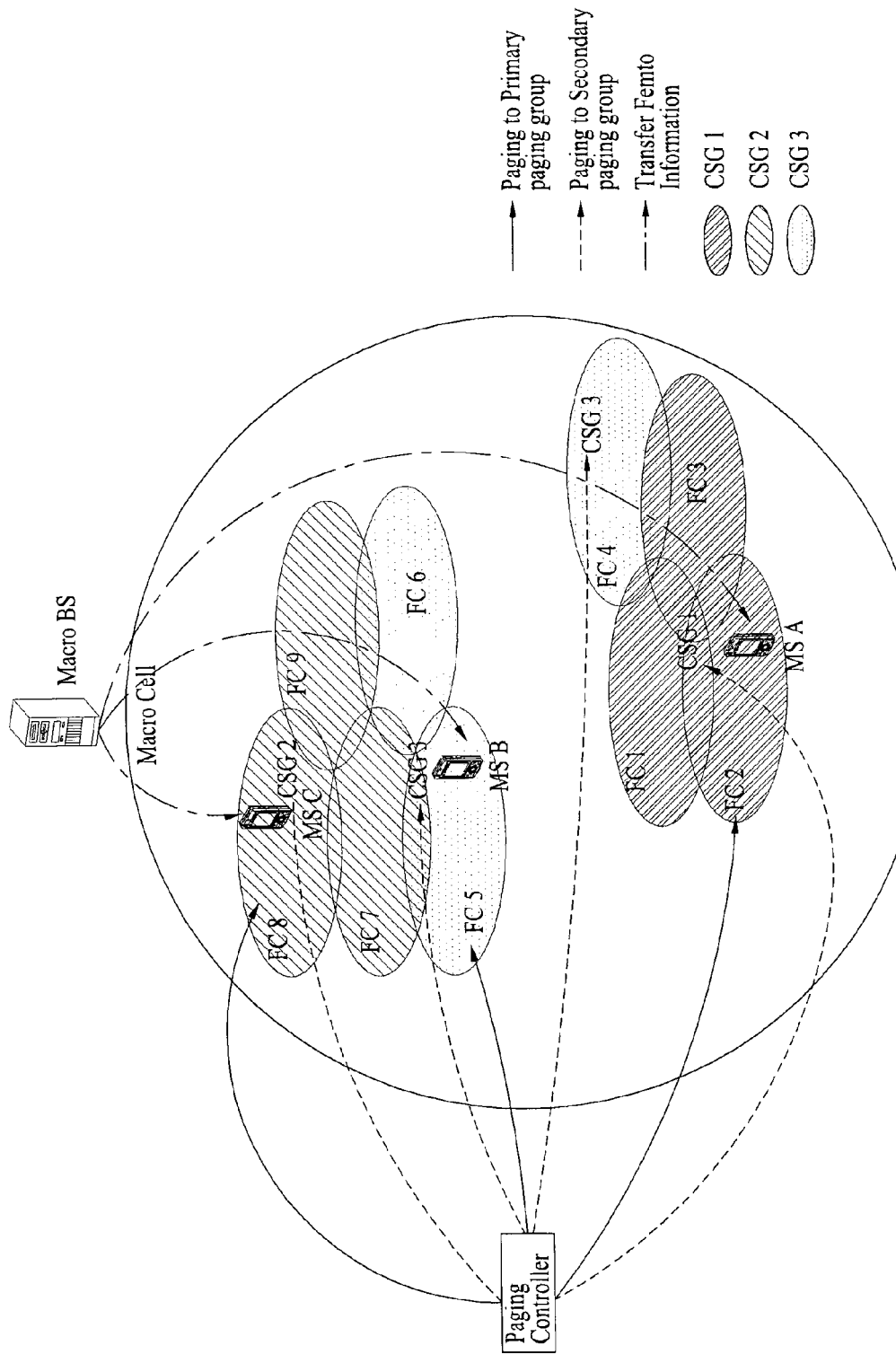
FIG. 8 illustrates a method for transmitting a paging message to an FPG according to another embodiment of the present invention.

FIG. 8 illustrates a method for transmitting a paging message to an FPG according to another exemplary embodiment of the present invention.

The basic configuration of system elements illustrated in FIG. 8 is similar to that illustrated in FIG. 7 except that FIG. 8 illustrates a method for paging an MS in two steps by a paging controller. In FIG. 8, the paging controller may page FC 2 to which MS A updated its location for the last time to detect MS A. FC 2 may be referred to as a primary FPG. That is, the femto BS in which MS A is located may be a paging group.

If the paging controller fails to receive a response from MS A after paging as many times as a threshold, it may transmit a paging message to all femto BSs included in a CSG to which MS A subscribed. CSG 1 may be referred to as a secondary FPG. That is, CSG 1 to which the MS subscribed may be a paging group.

In FIG. 8, the paging controller may perform paging in two steps. Specifically, the paging controller first pages a primary FPG and then pages a secondary FPG. Because an MS that has updated its location to a femto BS may not move much for a predetermined time, the paging controller pages the femto BS to which the MS updated its location for the last time, rather than it directly pages all femto BSs included in a CSG to which the MS subscribed. As a consequence, the message overhead of the paging controller may be reduced.

In FIG. 8, a macro BS may transmit femto information (e.g. a femto BS ID, a CSG ID and/or an FPG ID) to each MS by DREG-CMD, RNG-RSP, a BCH, and/or additional system information. FIGS. 7 and 8 are applicable to all exemplary embodiments of the present invention.

If a particular femto cell allows access from all MSs, a paging group may be managed for each femto cell. In this case, the femto cell may or may not be a member of a CSG. In other words, when the femto cell allows access from all MSs irrespective of CSGs, a paging group per femto cell may be managed.

Figure 9:
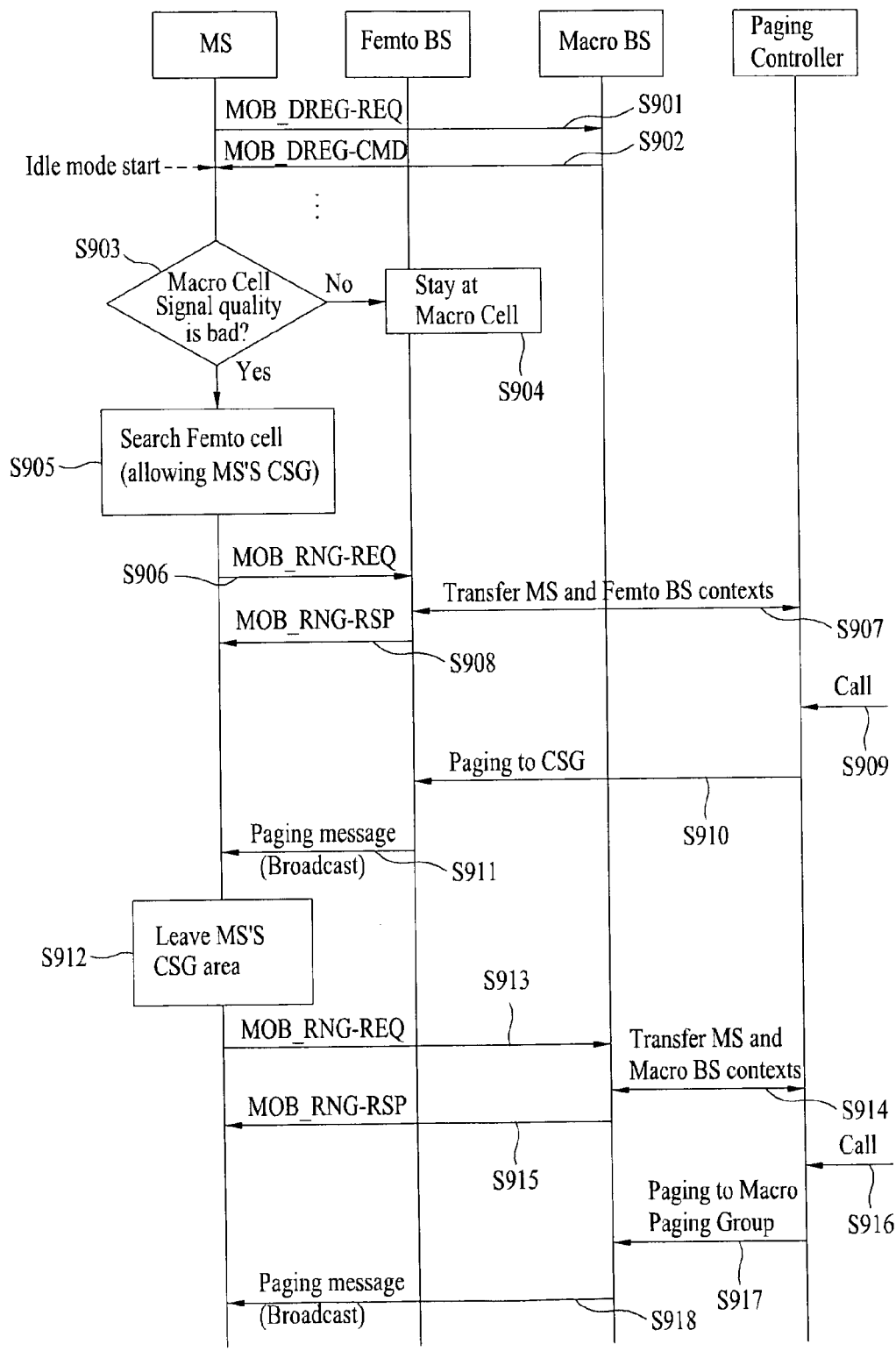
FIG. 9 is a diagram illustrating a signal flow for a location update method according to another embodiment of the present invention.

FIG. 9 is a diagram illustrating a signal flow for a location update method according to another exemplary embodiment of the present invention.

Referring to FIG. 9, when the signal quality of a macro cell is poor, an MS searches for a femto BS appropriate for location update. In this case, there is no need for the macro BS to broadcast the CSG IDs of femto cells included within the macro BS on a BCH.

The MS may transmit a MOB_DREG-REQ message to the macro BS to enter idle mode in step S901.

Upon receipt of the MOB_DREG-REQ message, the macro BS may transmit to the MS a MOB_DREG-CMD message including a paging cycle, a paging offset, a paging group ID, etc. in step S902.

In step 903, the MS may periodically measure the signal quality of the macro cell in the idle mode.

If the signal quality of the macro cell is good, the MS may stay in the macro BS without updating its location to a femto cell in step S904.

On the other hand, if the signal quality of the macro cell is poor, the MS may search for a femto cell in a CSG to which the MS subscribed to update its location to the detected femto cell in step S905.

Thus, the MS may transmit a MOB_RNG-REQ message to the femto cell to perform a location update in step S906.

The femto BS may transmit a context including an ID and MAC address of the MS, an ID of a CSG to which the MS subscribed, and an ID of the femto BS to a paging controller over a backbone network. Thus, the paging controller may be aware of the movement of the MS into the area of the specific femto BS. In step S907, the paging controller may transmit an FPG ID to the femto BS over the backbone network.

The femto BS may transmit a MOB_RNG-RSP message including the FPG ID to the MS in response to the MOB_RNG-REQ message in step S908.

Upon receipt of an external incoming call or packet in step S909, the paging controller may transmit a paging signal to all femto BSs included in the CSG to which the MS subscribed in step S910.

Upon receipt of the paging signal, each femto BS may broadcast a paging message to MSs within its cell area in step S911.

In a mobile communication environment, the MS may move from the area of the subscribed CSG to that of a non-subscribed CSG or the macro cell in step S912.

In this case, the MS may notify the macro BS that it has moved out of the subscribed CSG (i.e. the subscribed femto cell area) by location update. Accordingly, the MS may transmit a MOB_RNG-REQ message to the macro BS to update its location to the macro BS in step S913.

The macro BS may transmit a context including MS information and macro BS information to the paging controller. In step S914, the paging controller may transmit a macro paging group ID to the macro BS.

The macro BS may transmit a MOB_RNG-RSP message including the macro paging group ID to the MS in response to the MOB_RNG-REQ message in step S915.

Upon receipt of an external incoming call or packet in step S916, the paging controller may page the macro paging group of the MS in step S917.

Upon receipt of the paging signal from the paging controller, the macro BS may broadcast a paging message to MSs within its cell area in step S918.

Figure 10:
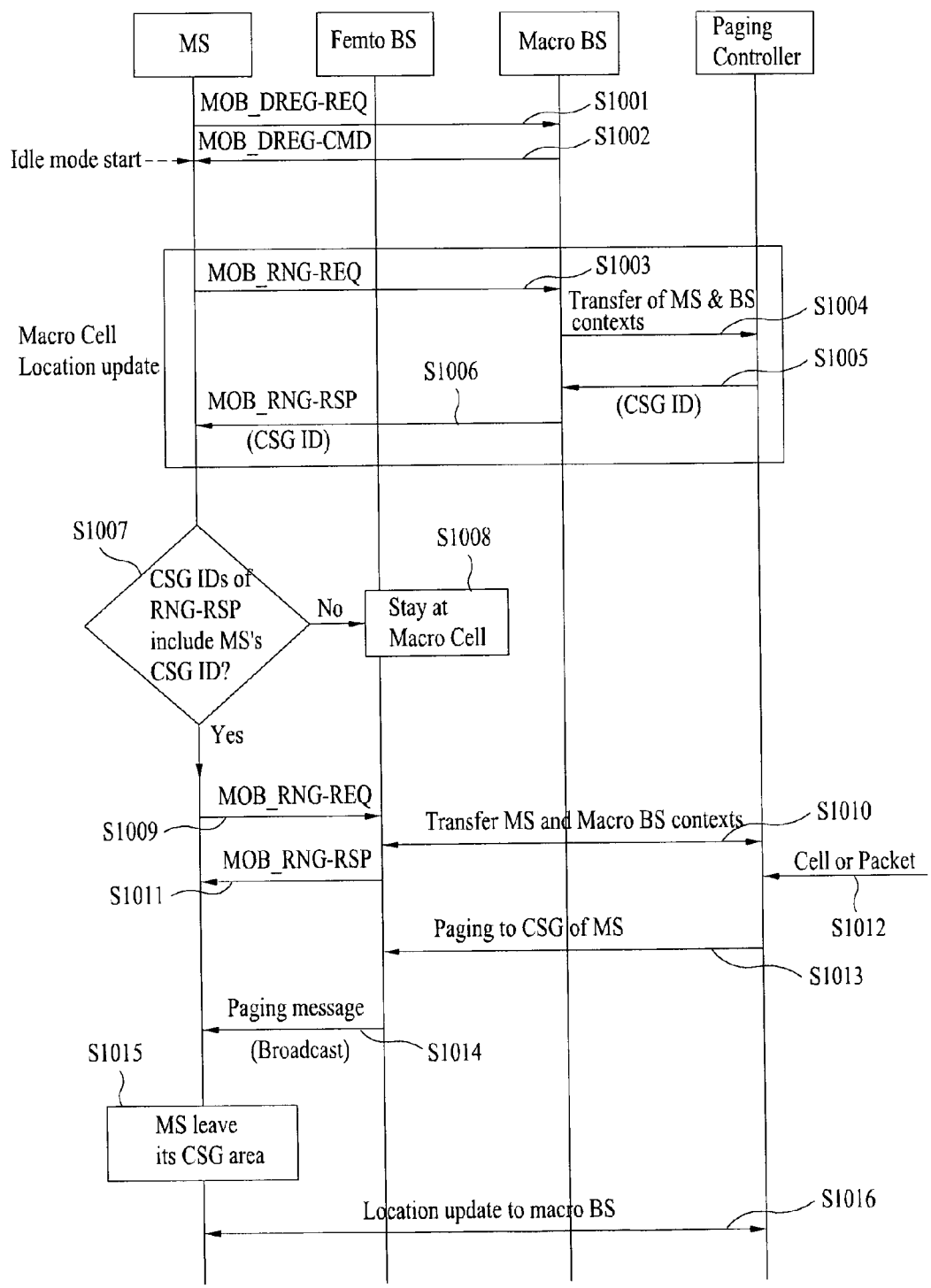
FIG. 10 is a diagram illustrating a signal flow for a location update method according to another embodiment of the present invention.

FIG. 10 is a diagram illustrating a signal flow for a location update method according to another exemplary embodiment of the present invention.

Referring to FIG. 10, an MS may transmit a MOB_DREG-REQ message to a macro BS to enter idle mode in step S1001.

Upon receipt of the MOB_DREG-REQ message, the macro BS may command the MS to enter the idle mode by transmitting to the MS a MOB_DREG-CMD message including a paging cycle, a paging offset, a paging group ID, etc. in step S1002.

If a location update triggering condition is satisfied (e.g. expiration of a location update timer or change of a paging group), the MS may update its location to the macro BS. Thus, the MS may transmit a MOB_RNG-REQ message to perform the location update with the macro BS in step S1003.

In step 1004, the macro BS may transmit a context including an ID and MAC address of the MS, an ID of a CSG to which the MS subscribed, and an ID of the macro BS to a paging controller over a backbone network.

The paging controller may transmit a list of the IDs of all CSGs included in the macro BS or the ID of a particular CSG to the macro BS. Or, the paging controller may transmit a recommended femto BS list or an MS-preferred femto BS list to the macro BS in step S1005.

The macro BS may transmit a MOB_RNG-RSP message including the CSG ID list received from the paging controller to the MS in response to the MOB_RNG-REQ message in step S1006.

In step S1007, the MS may compare the CSG ID (or the IDs included in the CSG ID list) received from the macro BS with IDs of CSGs that the MS subscribed to.

If the received CSG ID(s) is(are) different from any of the IDs of the subscribed CSGs, the MS may stay in the macro cell area in step S1008.

On the other hand, if the received CSG ID or any of the received CSG IDs is identical to one of the IDs of the subscribed CSGs, the MS may update its location to a femto BS included in the CSG. Therefore, the MS receives preambles from femto BSs included in the CSG during a paging listening interval and perform a location update to a specific femto BS by transmitting a MOB_RNG-REQ message including an ID of the femto BS to the femto BS in step S1009.

The femto BS may transmit a context including an ID, MAC address, and CSG ID of the MS and the ID of the femto BS to the paging controller over the backbone network, so that the paging controller is aware of the movement of the MS into the area of the specific femto BS in step S1010.

The femto BS may notify the MS whether the location update is successful by transmitting a MOB_RNG-RSP message to the MS in step S1011.

After the successful location update of the MS, upon receipt of an external incoming call or packet in step S1012, the paging controller may unicast a paging signal to the femto BS to which the MS subscribed in step S1013.

Upon receipt of the paging signal, the femto BS may broadcast a paging message to MSs within its cell area in step S1014.

Depending on a user's action or a system environment, the MS may move out of the CSG cell area in step S1015.

In this case, the MS may notify the paging controller that it has moved out of the subscribed CSG (i.e. the subscribed femto cell area) by a location update to the macro BS in step S1016.

In the illustrated case of FIG. 10, transmission of a list of the IDs of CSGs included in a macro cell from a paging controller or a macro BS may cause a great overhead to the system. Accordingly, it may be further contemplated as another exemplary embodiment of the present invention that the paging controller indicates whether there is an MS-subscribed CSG in the macro cell area.

For example, the paging controller may determine whether the macro BS to which the MS has updated its location includes a CSG to which the MS subscribed by acquiring the MAC address of the MS and information about CSGs to which the MS subscribed from the macro BS in step S1004.

Therefore, the paging controller may notify the macro BS only whether the macro BS includes a CSG that the MS subscribed to. In step S1006, the macro BS may transmit to the MS a MOB_RNG-RSP message including an information bit (e.g. 1 bit) indicating whether there is a CSG to which the MS subscribed. For instance, if the information bit is set to '0', this may imply the existence of a femto BS included in an MS-subscribed CSG. If the information bit is set to '1', this may mean the absence of a femto BS included in an MS-subscribed CSG.

In the presence of an MS-subscribed CSG within the macro BS, the macro BS may notify the MS of the presence of the MS-subscribed CSG within its cell area in step S1006. Hence, the MS may receive a preamble from each CSG during a paging listening interval and update its location to the CSG to which the MS subscribed.

Figure 11:
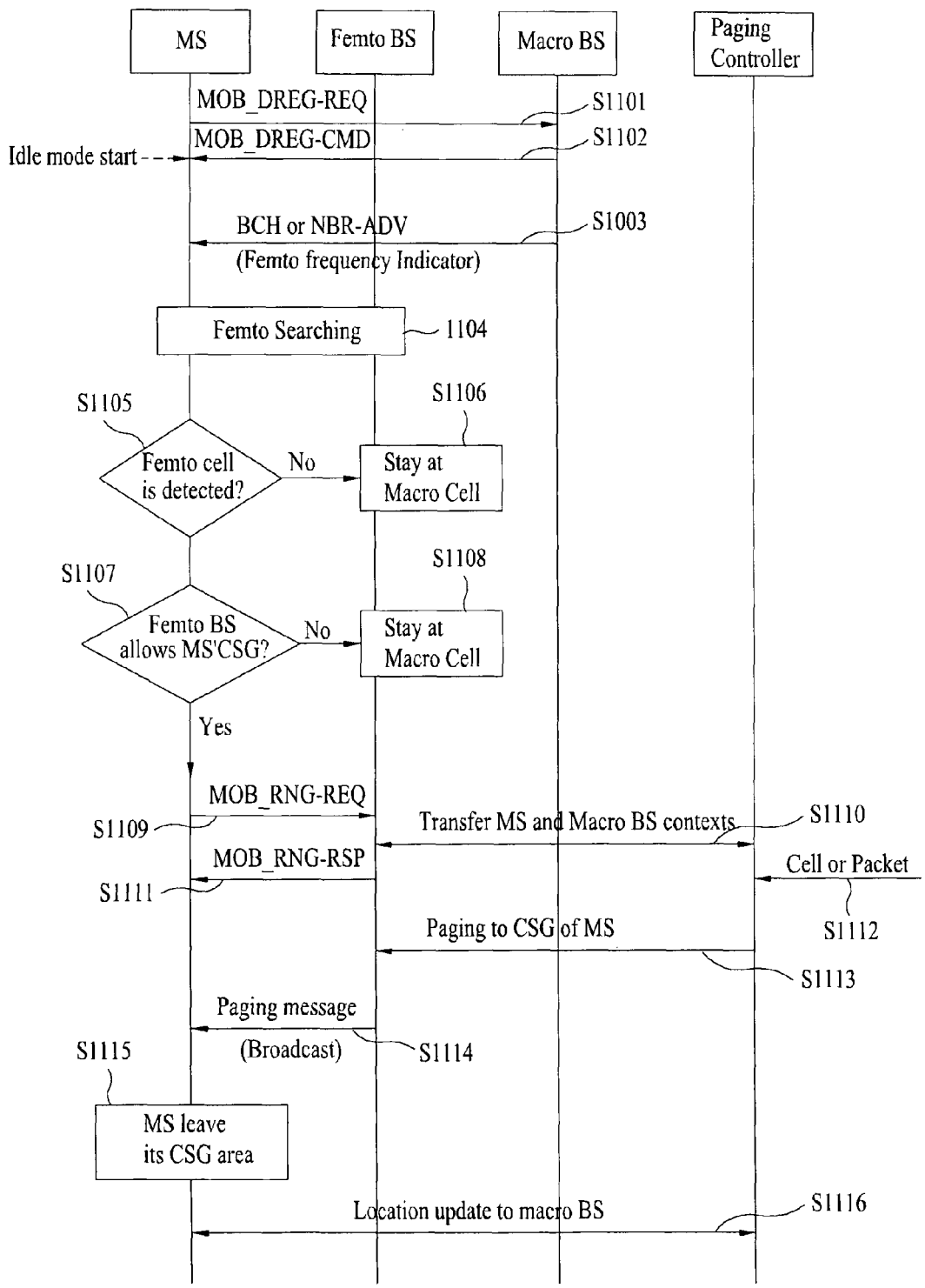
FIG. 11 is a diagram illustrating a signal flow for a location update method using a frequency band of a femto cell according to a further embodiment of the present invention.

FIG. 11 is a diagram illustrating a signal flow for a location update method using a frequency band of a femto cell according to a further exemplary embodiment of the present invention.

Referring to FIG. 11, an MS may transmit a MOB_DREG-REQ message to a macro BS to enter idle mode in step S1101.

In step S1102, the macro BS may command the MS to enter the idle mode by transmitting a MOB_DREG-CMD message including a paging cycle, a paging offset, and a paging group ID.

The macro BS may transmit femto frequency bandwidth information, a Femto Frequency Indicator field, and a Femto Searching Period field to the MS by a BCH, additional system information or an NBR-ADV message, periodically or upon request of the MS in step S1103.

The femto frequency bandwidth information indicates a frequency bandwidth allocated to femto BSs by the wireless access system. The Femto Frequency Indicator field provides one or more frequency bandwidths divided from the femto frequency bandwidth according to a predetermined rule. The Femto Searching Period field indicates a time period during which the femto frequency bandwidth is searched.

Table 8 illustrates an exemplary format of the Femto Frequency Indicator field.

TABLE 8

| Type | Length | Value | Scope |
|------|--------|-------|-------|
|  |  | Enumerated (Band I, Band II, Band III, Band IV, Band VIII, Band IX, Band X, Band XI, Band XII, Band XIII, Band XIV, Band XV, Band XVI, Band XVII, Band XVIII, Band XIX, Band XX, Band XXI, Band XXII, extension indicator) | BCH, Additional system information, NBR-ADV |

Referring to Table 8, the femto frequency bandwidth is divided into 22 partitions, for which indicators are set. When the macro BS selects an 11$^{th}$ femto frequency indicator (Band XI) and indicates it to the MS, the MS may search for a femto BS in the frequency bandwidth indicated by Band XI.

Table 9 illustrates an exemplary format of the Femto Searching Period field.

TABLE 9

| Type | Length | Value | Scope |
|------|--------|-------|-------|
|  |  | Period during which MS searches for femto cell in macro cell | BCH or Additional system information |

Referring to Table 9, the Femto Searching Period field specifies a period during which the MS searches for a femto cell in the macro cell. The Femto Searching Period field may be transmitted to the MS by a BCH, additional system information, and an NBR-ADV message, periodically or upon request of the MS.

In step S1104, the MS may search for a femto cell or femto BS periodically or during a femto searching interval according to the femto frequency bandwidth information, the Femto Frequency Indicator field, and/or the Femto Searching Period field.

The MS may determine whether there is a femto cell during the femto cell search in step S1105.

In the absence of a detected femto cell, the MS may stay in the macro BS in step S1106.

In the presence of a detected femto cell, the MS may determine whether the detected femto cell is included in a CSG to which the MS subscribed in step s1107. If the detected femto cell is not included in the CSG to which the MS subscribed, the MS stays in the macro cell in step S1108. If the detected femto cell is included in the CSG to which the MS subscribed, the MS may update its location to the femto cell.

Upon detection of a femto cell included in the CSG to which the MS subscribed, the MS may perform a location update to the femto BS in the CSG. Hence, the MS may update its location to the femto BS by transmitting a MOB_RNG-REQ message including an ID of the femto BS in step S1109.

The femto BS may transmit MS information and femto BS information to a paging controller over a backbone network, so that the paging controller is aware of the movement of the MS from the macro cell to the femto cell in step S1110.

The femto BS may notify the MS whether the location update is successful by a MOB_RNG-RSP message in step S1111.

Upon receipt of an external incoming call or packet after the location update of the MS is successful in step S1112, the paging controller may unicast a paging signal to the femto BS to which the MS moved in step S1113.

The femto BS may broadcast a paging message to MSs within its cell area in step S1114.

Depending on a user's action or a system environment, the MS may move out of the CSG cell area in step S1115.

Then the MS may notify the paging controller that it has moved out of the CSG area by updating its location to the macro BS in step S1116.

Now a description will be made of an MS and a BS (macro BS or femto BS) for implementing the above-described exemplary embodiments of the present invention, according to an exemplary embodiment of the present invention.

The MS may operate as a transmitter on an uplink and as a receiver on a downlink, while the BS may operate as a receiver on the uplink and as a transmitter on the downlink. That is, each of the MS and the BS may include a transmitter and a receiver for transmission and reception of information or data.

The transmitter and the receiver may include processors, modules, parts, and/or means for implementing the exemplary embodiments of the present invention. Especially, the transmitter and the receiver may include a module (means) for encrypting messages, a module for interpreting encrypted messages, an antenna for transmitting and receiving messages, etc. An example of the transmitter and the receiver will be described below with reference to FIG. 12.

Figure 12:
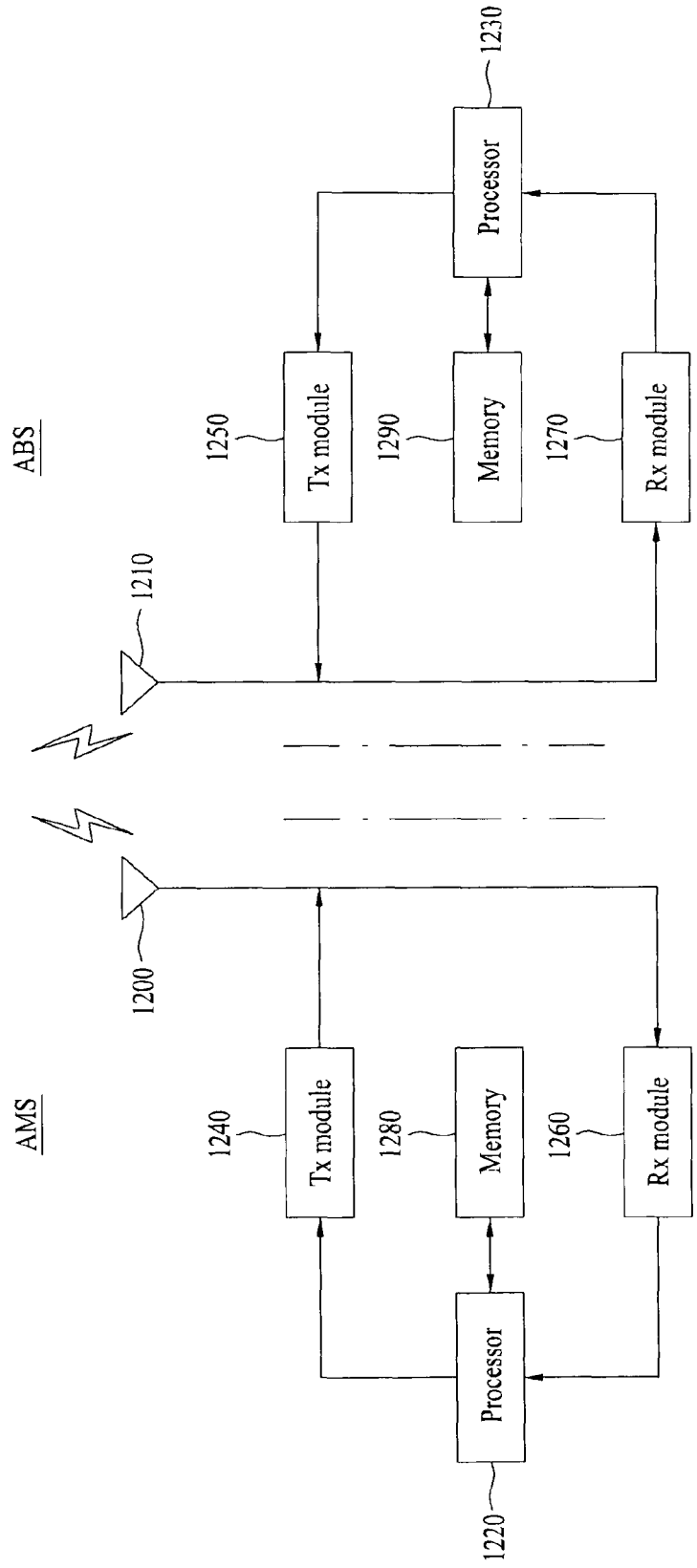
FIG. 12 is a block diagram of a transmitter and a receiver according to an embodiment of the present invention.

FIG. 12 is a block diagram of a transmitter and a receiver according to an exemplary embodiment of the present invention.

Referring to FIG. 12, the left part corresponds to the transmitter and the right part corresponds to the receiver. Each of the transmitter and the receiver may include an antenna 1200 or 1201, a processor 1202 or 1203, a Transmission (Tx) module 1205 or 1204, a Reception (Rx) module 1207 or 1206, and a memory 1209 or 1208. The components of the transmitter are the counter parts of those of the receiver. The components of the transmitter and the receiver will be described below in more detail.

The antennas 1200 and 1201 include Tx antennas for transmitting signals generated from Tx modules 1205 and 1204 and Rx antennas for receiving radio signals and providing the received radio signals to the Rx modules 1207 and 1206. If Multiple Input Multiple Output (MIMO) is supported, two or more antennas may be provided.

The processors 1202 and 1203 generally provide overall control to the transmitter and the receiver, respectively. Especially, the processors 1202 and 1203 may perform a control function for implementing the above-described exemplary embodiments of the present invention, a variable MAC frame control function based on service characteristics and a propagation environment, a handover function, an authentication and encryption function, etc.

Particularly, the processor of the MS may update a location by comparing a femto BS ID with BS list information or an ID of an MS-subscribed FPG according to the exemplary embodiments of the present invention.

For example, when the MS receives a message including BS list information from a macro BS, the processor of the MS may update its location to a first femto BS, if at least one of a plurality of IDs included in the list information is identical to an ID of the first femto BS.

In another example, when the MS receives information including an ID of an FPG having one or more femto BSs from the macro BS, the processor of the MS may update its location to the FPG, if the received FPG ID is identical to an ID of an MS-subscribed FPG. Herein, the processor may determine whether a location update triggering condition is satisfied between the femto BS and the MS, prior to the location update.

Also, the processor of the MS may measure the signal quality of the macro BS periodically and if the signal quality measurement is lower than a predetermined threshold, it may search for an appropriate femto BS and perform location update to the femto BS.

Meanwhile, the processor of the BS may perform scheduling by interpreting a MAC message or data received from the MS, allocating required uplink resources to the MS, generating an uplink grant carrying information about the resource allocation to the MS, and transmitting the uplink grant to the MS. In addition, the processor of the BS may receive a message including an ID required for the MS, such as a STation Identifier (STID), a Flow ID (FID), etc. from another processor or generate it, and then transmit it to the MS. Or the processor of the BS may generate a list of one or more BSs (e.g. femto BSs) preferred by the MS and transmit it to the MS.

The Tx modules 1205 and 1204 may encode and modulate transmission data scheduled by the processors 1202 and 1203 in a predetermined coding and modulation scheme and provide the modulated data to the antennas 1200 and 1201. Each pair of the Tx module 1205 and the antenna 1200, and the Tx module 1204 and the antenna 1201 may be shown to be incorporated into a single transmission part, while shown separately in FIG. 12.

The Rx modules 1207 and 1206 may recover original data by demodulating and decoding data received through the antennas 1200 and 1201 and provide the recovered data to the processors 1202 and 1203. Each pair of the Rx module 1207 and the antenna 1200, and the Rx module 1206 and the antenna 1201 may be shown to be incorporated into a single reception part, while shown separately in FIG. 12.

The memories 1209 and 1208 may store programs for processing and control of the processors 1202 and 1203 and temporarily store input/output data (on the side of the MS, an uplink grant received from the BS, system information, an STID, an FID, an action time, etc.). Each of the memories 1209 and 1208 may include at least one of storage media types such as a flash memory type, a hard disk type, a multimedia card micro type, a card-type memory (e.g. a Secure Digital (SD) or eXtreme Digital (XD) memory), a Random Access Memory (RAM), a Static Random Access Memory (SRAM), a Read-Only Memory (ROM), an Electrically Erasable Programmable Read-Only Memory (EEPROM), a Programmable Read-Only Memory, a magnetic memory, a magnetic disk, an optical disk, etc.

In the mean time, the BS may perform a control function for implementing the above-described exemplary embodiments of the present invention, Orthogonal Frequency Division Multiple Access (OFDMA) packet scheduling, Time Division Duplex (TDD) packet scheduling and channelization, a variable MAC frame control function based on service characteristics and a propagation environment, a real-time high-speed traffic control function, a handover function, an authentication and encryption function, a packet modulation/demodulation function for data transmission and reception, a high-speed packet channel coding function, a real-time MODEM control function, etc., by at least one of the above-described modules, or the BS may further include an additional module, part or means for performing these functions.

Mode for Invention

Various embodiments have been described in the best mode for carrying out the invention.

INDUSTRIAL APPLICABILITY

The exemplary embodiments of the present invention are applicable to various wireless access systems. For example, the wireless access systems are a 3GPP system, a 3GPP2 system, and/or an IEEE 802.xx system. Besides the wireless access systems, the exemplary embodiments of the present invention are applicable to all technical fields in which the wireless access systems find their applications.

Those skilled in the art will appreciate that the present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Also, it is obvious to those skilled in the art that claims that are not explicitly cited in each other in the appended claims may be presented in combination as an exemplary embodiment of the present invention or included as a new claim by a subsequent amendment after the application is filed.

The invention claimed is:

1. A method for updating, by a Mobile Station (MS), a location of the MS in idle mode, the method comprising:
    receiving a message including a femto Base Station (BS) list from a macro BS;
    receiving a preamble including an Identifier (ID) of a femto BS from the femto BS during a predetermined interval; and
    performing a location update to the femto BS when the ID of the femto BS is identical to an ID included in the femto BS list,
    wherein the femto BS list includes IDs of one or more femto BSs included in one or more macro BSs to which the MS is expected to move based on location information and speed information about the MS.

2. The method according to claim 1, wherein the femto BS list is transmitted from a paging controller to the macro BS over a backbone network.

3. The method according to claim 1, wherein: receiving the preamble comprises receiving the preamble at the MS; and
    performing the location update comprises performing the location update at the MS.

4. A method for updating, by a Mobile Station (MS), a location of the MS in idle mode, the method comprising:
    transmitting a first message including location information and speed information about the MS to a macro Base Station (BS);
    receiving a second message including a femto BS list from the macro BS;
    receiving a preamble including an Identifier (ID) of a femto BS from the femto BS during a predetermined interval; and
    performing a location update to the femto BS when the ID of the femto BS is identical an ID included in the femto BS list,
    wherein the femto BS list includes IDs of femto BSs included in one or more macro BSs to which the MS is expected to move based on the location information and speed information about the MS.

5. The method according to claim 4, wherein a paging controller makes the femto BS list and transmits the femto BS list to the macro BS over a backbone network.

6. The method according to claim 5, wherein the paging controller has preferred information about one or more femto BSs preferred by the MS and makes the femto BS list based on the preferred information.

7. The method according to claim 4, wherein the location information about the MS includes information about coordinates of the MS and information about a direction of the MS.

8. The method according to claim 4, wherein performing the location update to the femto BS comprises:
    initiating the location update to the femto BS by transmitting to the femto BS a ranging request message including the ID of the femto BS to which the MS performs the location update; and
    receiving from the femto BS a ranging response message notifying the MS whether the location update to the femto BS is successful.

9. A method for updating, by a Mobile Station (MS), a location of the MS in idle mode, the method comprising:
    receiving a message including an Identifier (ID) of a femto paging group including one or more femto Base Stations (BSs) from a macro BS;
    performing a location update to a femto BS included in the femto paging group when the ID of the femto paging group is identical to an ID of a femto paging group to which the MS subscribed; and
    receiving a paging message from the femto BS,
    wherein the paging controller transmits the paging message to a femto BS to which the MS updated a location of the MS for the last time and retransmits the paging message to all femto paging groups to which the MS subscribed when there is no response to the paging message from the MS, and
    wherein the femto paging group is included in a cell area of the macro BS.

10. The method according to claim 9, wherein the femto paging group is distinguished according to a service or a service provider.

11. The method according to claim 9, wherein the paging controller transmits the paging message to all femto paging groups to which the MS subscribed.

12. The method according to claim 9, further comprising updating a location to the macro BS when the MS moves out of a cell area of the femto paging group.

13. The method according to claim 9, wherein performing the location update comprises:
    determining whether a location update triggering condition is satisfied; and
    performing the location update to the femto BS when the location update triggering condition is satisfied.

14. The method according to claim 9, further comprising:
    periodically measuring signal quality of the macro Base Station (BS);
    searching for the femto BS included in the femto paging group to which the MS subscribed when the signal quality of the macro BS is lower than a predetermined threshold.

15. The method according to claim 9, further comprising performing a location update to the macro BS when the MS moves out of a cell area of the femto paging group.

16. The method according to claim 9, wherein performing the location update to the femto BS comprises:
    initiating the location update to the femto BS by transmitting to the femto BS a ranging request message including the ID of the femto BS to which the MS performs the location update; and
    receiving from the femto BS a ranging response message notifying the MS whether the location update to the femto BS is successful.

17. A Mobile Station (MS) comprising:
a receiver for receiving an external radio signal; and
a processor,
wherein:
    the receiver receives a femto Base Station (BS) list from a macro BS, the femto BS list including Identifiers (IDs) of one or more femto BSs included in one or more macro BSs to which the MS is expected to move based on location information and speed information about the MS and receives a preamble including an ID of a femto BS from the femto BS during a predetermined interval; and the processor compares the ID of the femto BS received by the receiver with the IDs included in the femto BS list and performs a location update to the femto BS when the ID of the femto BS is identical to one of the IDs included in the femto BS list.

18. The method according to claim 1, wherein performing the location update to
the femto BS comprises:
initiating the location update to the femto BS by transmitting to the femto BS a ranging request message including the ID of the femto BS to which the MS performs the location update; and
receiving from the femto BS a ranging response message notifying the MS whether the location update to the femto BS is successful.

19. The MS according to claim 17, wherein the processor initiates the location update to the femto BS by controlling a transmitter of the MS to transmit to the femto BS a ranging request message including the ID of the femto BS to which the MS performs the location update, and the receiver receives from the femto BS a ranging response message notifying the MS whether the location update to the femto BS is successful.

* * * * *